US008122138B2

(12) United States Patent
Blakley, III et al.

(10) Patent No.: US 8,122,138 B2
(45) Date of Patent: Feb. 21, 2012

(54) METHOD AND SYSTEM FOR USER-DETERMINED ATTRIBUTE STORAGE IN A FEDERATED ENVIRONMENT

(75) Inventors: George Robert Blakley, III, Round Rock, TX (US); Heather Maria Hinton, Austin, TX (US); Birgit Monika Pfitzmann, Samstagern (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/841,207

(22) Filed: Jul. 22, 2010

(65) Prior Publication Data
US 2010/0287235 A1 Nov. 11, 2010

Related U.S. Application Data

(62) Division of application No. 10/334,605, filed on Dec. 31, 2002, now Pat. No. 7,797,434.

(51) Int. Cl.
*G06F 15/16* (2006.01)
*G06F 15/173* (2006.01)
*G06F 21/00* (2006.01)

(52) U.S. Cl. .................. 709/229; 709/225; 705/53
(58) Field of Classification Search .............. 709/225, 709/227, 229; 705/53, 64–67, 75–76, 78–79
See application file for complete search history.

(56) References Cited

U.S. PATENT DOCUMENTS

| | | | |
|---|---|---|---|
| 5,968,126 A | 10/1999 | Ekstrom et al. | |
| 6,105,131 A | 8/2000 | Carroll | |
| 6,119,160 A | 9/2000 | Zhang et al. | |
| 6,185,184 B1 | 2/2001 | Mattaway et al. | |
| 6,678,731 B1 | 1/2004 | Howard et al. | |
| 2001/0011250 A1 | 8/2001 | Paltenghe et al. | |
| 2002/0004783 A1 | 1/2002 | Paltenghe et al. | |
| 2002/0091646 A1* | 7/2002 | Lake et al. | 705/67 |
| 2002/0133719 A1* | 9/2002 | Westerdal | 713/201 |
| 2003/0061057 A1 | 3/2003 | Todd et al. | |

(Continued)

FOREIGN PATENT DOCUMENTS

EP 0917119 5/1999

(Continued)

OTHER PUBLICATIONS

Walker, "Digital Wallets", ComputerWorld, Jul. 5, 1999.

(Continued)

*Primary Examiner* — Peling Shaw
(74) *Attorney, Agent, or Firm* — Jeffrey S. LaBaw; David H. Judson

(57) ABSTRACT

A system is presented for facilitating management of user attribute information at one or more attribute information providers (AIPs), which can manage the user's attribute information in accordance with user-selected or administratively-determined options, including options that are stored in attribute release policies and/or dynamically determined during a transaction. E-commerce service providers (ECSPs), such as online banks or merchants, also maintain a relationship with an AIP such that the ECSP can trust the user attribute information that is provided by the AIP on behalf of the user. The user can complete transactions that require user attribute information at any ECSP without having to have previously established a relationship with that particular ECSP. If the ECSP has a relationship with one of the user's AIPs, then the user will be able to direct the ECSP to an AIP when the ECSP needs user attribute information to complete a transaction for the user.

24 Claims, 11 Drawing Sheets

U.S. PATENT DOCUMENTS

| | | |
|---|---|---|
| 2003/0084170 A1 | 5/2003 | de Jong et al. |
| 2003/0126039 A1 | 7/2003 | Kiyose et al. |
| 2003/0139934 A1 | 7/2003 | Mandera |
| 2003/0217288 A1 | 11/2003 | Guo et al. |
| 2004/0158743 A1 | 8/2004 | Ham et al. |

FOREIGN PATENT DOCUMENTS

| | | |
|---|---|---|
| EP | 1077419 | 2/2001 |
| EP | 1099996 | 5/2001 |
| EP | 1168264 | 1/2002 |
| WO | WO 01/50299 | 7/2001 |
| WO | WO 01/65340 | 9/2001 |
| WO | WO 02/103496 | 12/2002 |

OTHER PUBLICATIONS

International Search Report, PCT/GB03/05439, Apr. 27, 2004.

\* cited by examiner

*FIG. 1C*
*(PRIOR ART)*
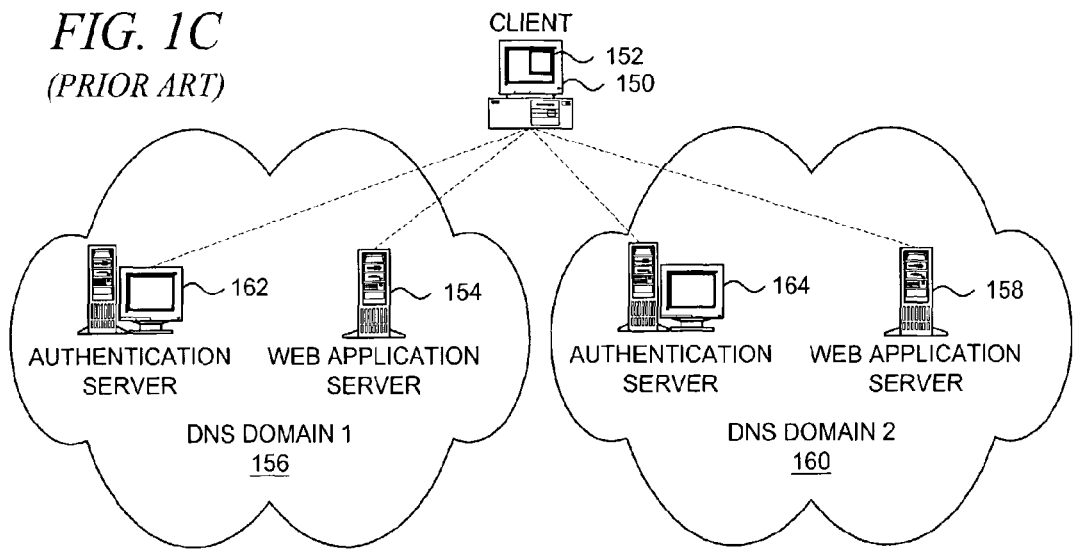
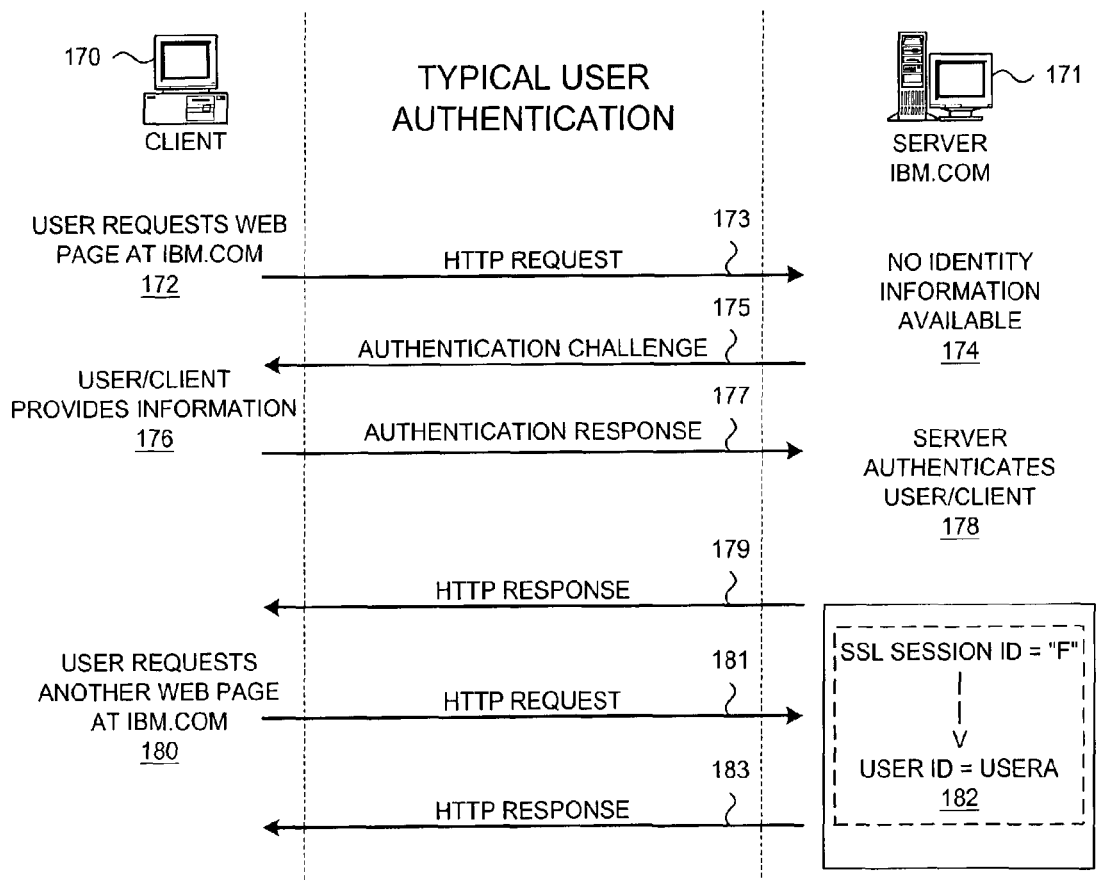
*FIG. 1D*
*(PRIOR ART)*

```
Browser Application                                    _ □ ×
File   Edit   View   Tools   Window   Help                       ~ 900
Back | Forward | Reload | Stop | Location: http://w-aisp.com/ibm/   ~ 902
```

IBM.COM E-COMMERCE MARKETPLACE ~ 910
___

W-AIP.COM ATTRIBUTE INFORMATION SERVICE

IBM.COM IS REQUESTING THE FOLLOWING ATTRIBUTES FOR THIS TRANSACTION.
PLEASE ENTER THE FOLLOWING INFORMATION.

|  | REQUESTED ATTRIBUTES: |  | ALWAYS ASK FOR PERMISSION BEFORE RELEASING |
|---|---|---|---|
| 920 ~ | DRIVER LICENSE NUMBER: | [   ] | ● YES   ○ NO |
| 922 ~ | BANK NAME: | [   ] | ● YES   ○ NO |
| 924 ~ | BANK ACCOUNT NUMBER: | [   ] | ● YES   ○ NO |
| 926 ~ | CREDIT CARD NUMBER: | [   ] | ● YES   ○ NO |
| 928 ~ | CREDIT CARD EXPIRATION: | [   ] | ● YES   ○ NO |

⏟ 930

( VIEW PRIVACY POLICY FOR IBM.COM ) ~ 912
( VIEW PRIVACY POLICY FOR W-AIP.COM ) ~ 914

( OK ) ~ 904    ( CANCEL ) ~ 906    ( RESET ) ~ 908

*FIG. 9A*

METHOD AND SYSTEM FOR USER-DETERMINED ATTRIBUTE STORAGE IN A FEDERATED ENVIRONMENT

CROSS-REFERENCE TO RELATED APPLICATIONS

"This application is a division of Ser. No. 10/334,605, filed Dec. 31, 2002, now U.S. Pat. No. 7,797,434."

The present application also is related to the following applications with a common assignee:

U.S. Ser. No. 10/512,229, filed Mar. 26, 2003, titled "Efficient browser-based identity management providing personal control and anonymity";

U.S. Ser. No. 09/710,926, filed Nov. 9, 2000, titled "Method and system for Web-based cross-domain single-sign-on authentication";

U.S. Ser. No. 10/034,725, filed Dec. 19, 2001, titled "System and method for user enrollment in an e-community", now U.S. Pat. No. 6,993,596;

U.S. Ser. No. 10/184,664, filed Jun. 28, 2002, titled "Method and system for user-determined authentication in a federated environment";

U.S. Ser. No. 10/334,326, filed Dec. 31, 2002, titled "Method and system for user enrollment of user attribute storage in a federated environment", now U.S. Pat. No. 7,725,562;

U.S. Ser. No. 10/334,609, filed Dec. 31, 2002, titled "Method and system for enroll-thru operations and reprioritization operations in a federated environment", now U.S. Pat. No. 7,587,491; and U.S. Ser. No. 10/334,539, filed Dec. 31, 2002, titled "Method and System for Attribute Exchange in a Heterogeneous Federated Environment".

BACKGROUND OF THE INVENTION

1. Field of the Invention

The present invention relates to an improved data processing system and, in particular, to a method and apparatus for multicomputer data transferring. Still more particularly, the present invention provides a method and apparatus for distributed data storage and data transfer of user information.

2. Description of Related Art

The Internet has greatly facilitated the exchange of information for many purposes. Many applications have incorporated Internet-related standards, thereby enabling organizations to collaborate over the Internet while maintaining private networks. As Internet-connected applications have become more sophisticated, organizations have shown a desire to increase the level of collaboration, particularly within so-called federated environments.

In a federated environment, each user is typically registered in a home domain that provides certain fundamental services to a user. When a user logs into the user's home domain through some form of authentication process, the user is allowed to access secured resources that are supported by the home domain in accordance with the user's previously defined authorization attributes. In this manner, the user has a permanent relationship with the user's home domain.

In addition, the home domain may have a permanent relationship with many other domains in a federation or a federated environment, sometimes also called business-to-business (B2B) or e-community domains. A federation may or may not require explicit business relationships between pairwise sets of participating enterprises. Each domain or organization within a federated environment may share resources to some extent with users in other domains or organizations within the federated environment.

As users become more knowledgeable about the Internet, they expect enterprises to collaborate so that burdens on the user are reduced. These expectations also apply to management of informational characteristics about a user, sometimes referred to as user attributes. In some circumstances and under certain restrictions, a user might assume that once he or she has provided some user information to one computer system, the user information might be available throughout the user's current session without regard to the various computer boundaries that are sometimes invisible to the user. Enterprises generally try to fulfill these expectations in the operational characteristics of their deployed systems, not only to placate users but also to increase user efficiency, whether the user efficiency is related to employee productivity or customer satisfaction.

More specifically, with the current computing environment in which many applications use Web-based user interfaces that are accessible through a common browser, users expect more user-friendliness and low or infrequent barriers to movement from one Web-based application to another. In this context, users are coming to expect the ability to jump from interacting with an application on one Internet domain to another application on another domain with minimal regard to the information barriers between each particular domain. Even if many systems provide easy-to-use Web-based interfaces, though, a user may still be forced to reckon with multiple user information requests or requirements that stymie user movement across a set of domains. Subjecting a user to multiple information requests or requirements in a short time frame significantly affects the user's efficiency.

Most systems that manage user attributes were designed to work within a single enterprise rather than in a federated environment of organizations which are loosely coupled. Hence, the barriers that are presented by user information requests or requirements are becoming increasingly common as more organizations participate in federated computing environments.

As mentioned above, within a federated environment, a user that is a registered member of one organization can get access to a remote resource that is controlled by another organization; each organization is responsible for the administration of the organization's own registered users and resources, yet the computer systems of the federated organizations interoperate in some manner to share resources between registered members of the organizations. These systems have not offered significant user-level control over the extent to which user attributes are released to, or shared with, other organizations. However, privacy laws require that some organizations allow users to control the personally identifiable information that is released by an organization and to whom it is released. The demand for more privacy laws has increased as users have learned the ways in which private information can be abused.

Therefore, it would be advantageous to provide a method for user-level control over the storage, management, and distribution of user attributes within a federated environment while minimizing user inconvenience and/or information barriers between federated organizations.

SUMMARY OF THE INVENTION

A method, apparatus, system, or computer program product is presented for facilitating management of user attribute information at one or more attribute information providers. Attribute information providers can manage a user's attribute information in accordance with user-selected or administratively-determined options, including options that are stored in attribute release policies and/or dynamically determined during a transaction. The user can complete transactions that require user attribute information at any e-commerce service provider without having to have previously established a relationship with that particular e-commerce service provider.

An e-commerce service provider, such as an online bank or online merchant, maintains a relationship with an attribute information provider such that the e-commerce service provider can trust the user attribute information that is provided by the attribute information provider on behalf of the user. An e-commerce service provider allows a specification of one or more attribute information providers to be used by the e-commerce service provider to retrieve user attribute information for a user. The e-commerce service provider may receive a specification of an attribute information provider, e.g., in the form of an HTTP cookie, along with the request for access to a resource. If the e-commerce service provider has a relationship with one of the user's attribute information providers, then the user will be able to direct the e-commerce service provider to an attribute information provider when the e-commerce service provider needs user attribute information to complete a transaction for the user. The user attribute information is used by the e-commerce service provider in performing a user-specific operation with respect to a requested resource, such as determining whether the user should be granted access to the resource or for personalization purposes. The e-commerce service provider may retrieve user attributes from multiple attribute information providers that have been specified in a prioritized manner.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 1C illustrates a Web-based environment in which the present invention may be implemented;

FIG. 1D is a data flow diagram illustrating a prior art process that may be used when a client attempts to access a protected resource;

FIG. 9A is a graphical user interface window that is presented to a user by an attribute information provider that is requesting the user to input user attribute information that will be used by an e-commerce service provider within a federated environment.

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
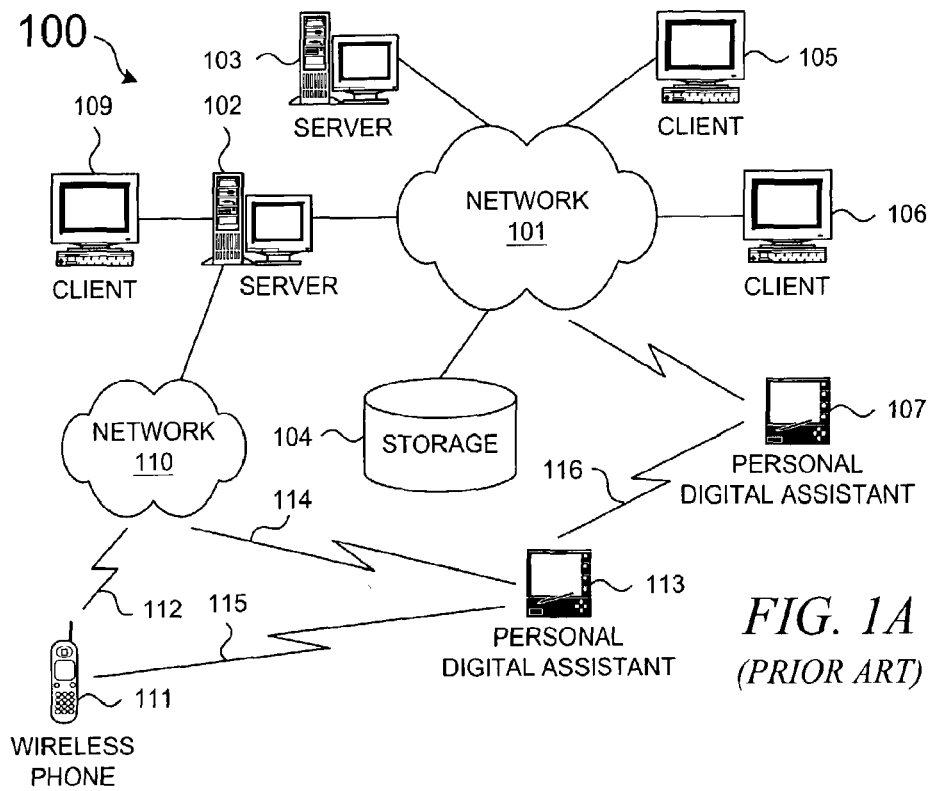
FIG. 1A depicts a typical network of data processing systems, each of which may implement the present invention.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP, TCP/IP, HTTP, etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The present invention could be implemented on a variety of hardware platforms and software environments. FIG. 1A is intended as an example of a heterogeneous computing environment and not as an architectural limitation for the present invention.

Figure 1B:
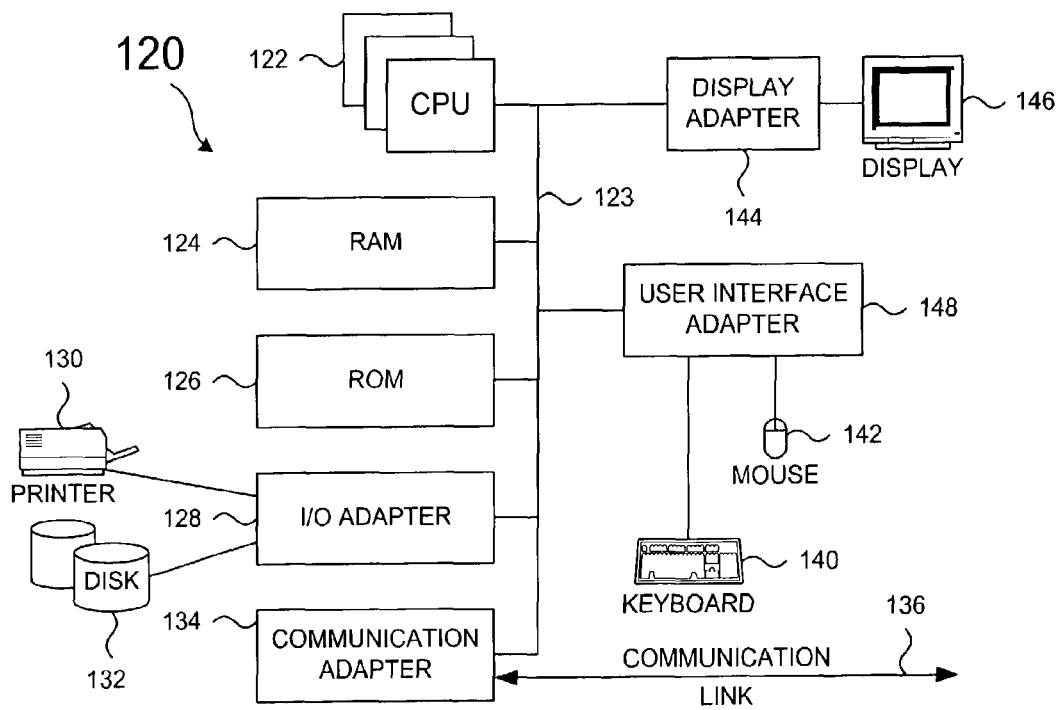
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well-known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

With reference now to FIG. 1C, a network diagram illustrates a more specific, yet generic, Web-based environment in which the present invention may be implemented. In this environment, a user of a browser 152 at client 150 desires to access a protected resource on web application server 154 in DNS domain 156, or on web application server 158 in DNS domain 160. A protected resource is a resource (an application, an object, a document, a page, a file, executable code, or other computational resource, communication-type resource, etc.) that is only accessed or retrieved if the requesting client browser is both authenticated and authorized. Each DNS domain may have an associated authentication server 162 and 164. Typically, once the user is authenticated by the authentication server, a cookie may be set and stored in a cookie cache in the browser. The requesting client may make an intra-domain request or an inter-domain request for the protected resource. An intra-domain request means that the target resource is located on the same server that performs the authentication. An inter-domain request means that the target resource is located within the same Internet domain but is on a different server than the authentication server which established the authentication. A cross-domain request means that the user wishes to access a protected resource that is outside the DNS domain that the user is currently using.

With reference now to FIG. 1D, a data flow diagram illustrates a prior art process that may be used when a client attempts to access a protected resource. As illustrated, the user at a client workstation 170 seeks access over a computer network to a protected resource on a server 171 through the user's Web browser executing on the client workstation. As noted above, a protected resource is identified by a Uniform Resource Locator (URL), or more generally, a Uniform Resource Identifier (URI), that can only be accessed by an authenticated and authorized user. The computer network may be the Internet, an intranet, or other network, as shown in FIG. 1A or FIG. 1B, and the server may be a Web Application Server (WAS), a server application, a servlet process, or the like.

The process is initiated when the user requests the protected resource, such as a Web page within the domain "ibm.com" (step 172). The Web browser (or associated application or applet) generates an HTTP request message that is sent to the Web server that is hosting the domain "ibm.com" (step 173). The server determines that it does not have an active session for the client (step 174), so the server requires the user to perform an authentication process by sending the client some type of authentication challenge (step 175). The authentication challenge may be in various formats, such as a Hypertext Markup Language (HTML) form. The user then provides the requested or required information (step 176), such as a user identifier and an associated password, or the client may automatically return certain information.

The authentication response information is sent to the server (step 177), at which point the server authenticates the user or client (step 178), e.g., by retrieving previously submitted registration information and matching the presented authentication information with the user's stored information. Assuming the authentication is a success, an active session is established for the authenticated user or client.

The server then retrieves the requested Web page and sends an HTTP response message to the client (step 179). At that point, the user may request another page within "ibm.com" (step 180) within the browser by clicking a hypertext link, and the browser sends another HTTP Request to the server (step 181). At that point, the server recognizes that the user has an active session (step 182), and the server sends the requested Web page back to the client in another HTTP response message (step 183).

Although FIG. 1D depicts a typical prior art process, it should be noted that other alternative session state management techniques may be depicted, such as using cookies to identify users with active sessions, which may include using the same cookie that is used to provide proof of authentication.

FIG. 1C and FIG. 1D illustrate user authentication operations. In general, after a user has been authenticated within a domain, it may be assumed that the domain provides user access to various resources. Although the authentication process merely establishes the identity of a user, in some domains, the identity of a user may be sufficient information in a determination to provide access to resources. In these domains, access to resources may be provided to all authenticated users. In other domains, however, when a user requests a resource, a resource manager within a domain may need additional information about the user, i.e. user attributes, before performing an action on behalf of the user. Typically, the identity of the user is employed to obtain user attributes that have been previously associated with the user. After the resource manager obtains the necessary user attributes, the resource manager provides the resource to the user after employing the retrieved user attributes in some manner, e.g., in a personalization operation or an authorization operation. The local entity that manages user attributes at a typical service provider within an enterprise or domain may be generally termed an attribute information manager (AIM).

A variety of resource managers may operate within a domain or at different domains, and each resource manager may require user attributes for a particular purpose. For example, an authorization server may need user attributes in order to determine whether a user has the proper privilege attributes to access a particular resource in accordance with access control policies associated with a resource. If the user has the necessary privilege attributes, then the authorization server provides the resource to the user. In another example, a content server may require user attributes in order to personalize in some manner the content that is returned to the user. The content server may limit or modify the content that is sent to the user based on user attributes, e.g., gender, for marketing or other purposes.

Figure 2:
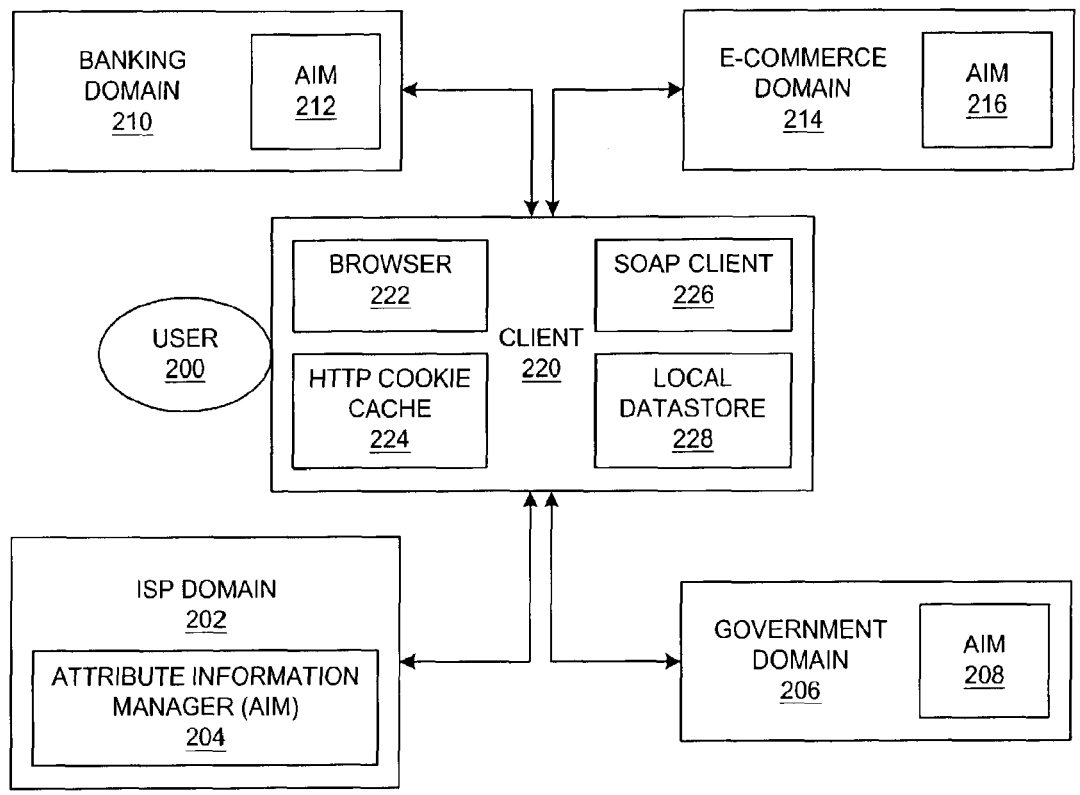
FIG. 2 is a block diagram that depicts an example of a typical online transaction that requires user attributes.

With reference now to FIG. 2, a block diagram depicts an example of a typical online transaction that requires user attributes. FIG. 2 illustrates some of the difficulties that a user may experience when accessing multiple domains that require the user to provide user information. Referring again to FIG. 1C and FIG. 1D, a user may be required to complete an authentication operation prior to gaining access to a controlled resource, as shown in FIG. 1D. Although not shown in FIG. 1D, an attribute information manager may be deployed on server 171 to manage user attributes that are required for an access control decision. As shown in FIG. 1C, a user may have multiple current sessions within different domains 156 and 160, and although they are not shown in FIG. 1C, each domain may employ an attribute information manager. In a similar manner, FIG. 2 also depicts a set of domains, each of which may support some type of attribute information manager.

User 200 may be registered at domain 202, which may support attribute information manager 204 that manages user attributes for user 200. Domain 202 may be an Internet Service Provider (ISP) that provides Internet connection services, email services, and possibly other e-commerce services. Alternatively, domain 202 may be an Internet portal that is frequently accessed by user 200. Domain 202 may store a wide-ranging set of user attributes for user 200, including personal, financial, and administrative attributes, which might include content preferences.

Government domain 206 supports attribute information manager 208 that manages various government-related attributes about user 200. Banking domain 210 supports attribute information manager 212 that manages various attributes for a bank. E-commerce domain 214 similarly supports attribute information manager 216.

Each of the above-noted domains may use some form of storage on client 220 that is operated by user 200 in order to accomplish certain operations on behalf of client 220. For example, if user 200 is using browser application 222 to access an application that is supported by a domain, then the domain may set an HTTP cookie in cookie cache 224. If user 200 is using some other application, e.g., an application that incorporates functionality to act as SOAP client 226, then local datastore 228 may be used as client-side storage.

As noted previously, when a user attempts to move from one domain to another domain within the Internet or World Wide Web by accessing resources at the different domains, a user may be subjected to multiple user information requests or requirements, which can significantly slow the user's progress across a set of domains. Subjecting a user to multiple information requests or requirements in a short period of time may significantly affect the user's ability to complete transactions efficiently. Using FIG. 2 as an exemplary environment, user 200 may be involved in a complicated online transaction with e-commerce domain 214 in which the user is attempting to purchase an on-line service that is limited to users who are at least 18 years old and who have a valid driver license, a valid credit card, and a U.S. bank account.

Although user 200 should be able to provide all of the required user attribute information to domain 214, it requires time and patience to enter the information, particularly when user 200 may be frustrated by the fact that all user attribute information is already stored somewhere within the other domains. For example, user 200 may have previously visited e-commerce domain 214 and purchased a different on-line service. During the prior transaction, user 200 may have only been required to provide a credit card number, but user 200 may or may not have given permission to domain 214 to store the credit card number in a user profile that is managed by attribute information manager 216. However, if user 200 was not required to provide any other user attribute information for the prior transaction, domain 214 would not have access to the user attribute information that is required for the current transaction. Attribute information manager 212 at domain 210 has the user's bank account information, which may be required by domain 214 as a backup payment source if a credit card transaction is declined. Attribute information manager 208 at government domain 206 has the user's driver license information, yet neither domain 206 nor domain 210 supports a mechanism for transferring user attribute information to domain 214. User 200 must somehow have all of this user attribute information communicated to domain 214 in a secure and authenticate-able manner before user 200 will receive the desired on-line service.

In the context of the World Wide Web, users are coming to expect the ability to interact with an application on one Internet domain to another application on another domain with minimal regard to the information barriers between each particular domain. Users do not want the frustration that is caused by the scenario shown in FIG. 2, particularly if the users know that the domains are somehow affiliated in a federated environment. In other words, users expect that organizations within a federated environment should interoperate at a much higher level than unaffiliated domains. Moreover, users generally want domains to respect their privacy. In addition, users may prefer to limit the domains that permanently store their private information, thereby limiting the effects of unauthorized disclosure of personal information, e.g., the after-effects of a domain whose security has been breached. User preferences may vary with the identity of the domain or the nature of the information that is used by the domain.

Given the preceding brief description of current technology and a few of its associated problems, the description of the remaining figures relates to federated computer environments in which the present invention may operate. Prior to discussing the present invention in more detail, however, some terminology is introduced.

A typical networked computing environment can be broadly described as comprising users and service providers. A service provider delivers some form of information, informational access, or access to resources to a user electronically via computer systems and networks, such as those shown in FIG. 1A. A user may be regarded as a consumer of the provided service. In general, many different types of service providers may be present in a given networked environment, such as the environment shown in FIG. 2. Online merchants represent a class of e-commerce service providers, while Web portals represent a class of information service providers. Internet service providers are entities that provide a network communication link to the Internet as a service.

An enterprise may be regarded as the business entity, such as a corporation, that operates a service provider. Although not meant to be limiting in the interpretation of the present invention, a service may be regarded as a defined function or a defined set of functions; the service may be made available to a user, enterprise, or other entity, or alternatively, the product of a service may be delivered to a user, enterprise, or other entity. A service provider may make a particular service available in response to a variety of circumstances: after entering into a financial or contractual agreement, after merely receiving a simple request, or after some other type of exchange. For example, some Web sites restrict access to valuable information to paying customers, whereas other Web sites operate by making content freely available to all requesting entities while interjecting advertisements into the content. With respect to the present invention, a service provider may be regarded as the data processing systems and the communication facilities that electronically deliver or make available a particular type of functionality.

In a typical computing environment, enterprises communicate with each other by adhering to communication protocols and other types of standards, but the enterprises do not necessarily agree to provide services in a common manner. Typically, an enterprise has its own user registry and maintains relationships with its own set of users; each enterprise typically has its own means of authenticating its users. In addition, each enterprise typically has its own means for managing user attribute information, as described above with respect to FIG. 2. The self-contained nature of these enterprises gives rise to the above-mentioned informational barriers within the typical computing environment.

In contrast to a typical computing environment, a federated computing environment has additional features that allow enterprises to interoperate in order to provide functionality in some common fashion. For example, a typical federation allows a union of enterprises to cooperate in a collective manner through transitive trust relationships.

Figure 3:
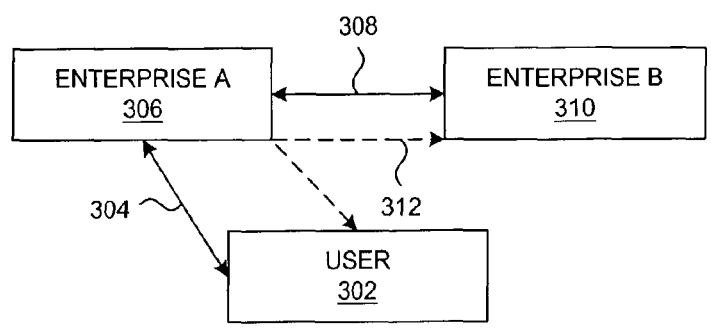
FIG. 3 is a block diagram that depicts a manner in which a set of entities can establish a typical transitive trust relationship.

With reference to FIG. 3, a block diagram depicts a manner in which a set of entities can establish a typical transitive trust relationship. If user 302 has trust relationship 304 with enterprise 306, and enterprise 306 has trust relationship 308 with enterprise 310, then user 302 may interact with enterprise 310 in some limited fashion based on trust assertion 312 from enterprise 306 to enterprise 310 on behalf of user 302.

Transitive trust relationships can be employed for various purposes, such as the transfer of authentication information, attribute information, or other types of information. Authentication is the process of validating a set of credentials that are provided by a user or on behalf of a user. Authentication is accomplished by verifying something a user knows, something a user possesses, or some characteristic about the user through a challenge/response operation using various authentication protocols. For example, verification of something that a user knows may be accomplished through a shared secret, such as a user's password as illustrated in FIG. 1D, or through something that is known only to a particular user, such as a user's cryptographic key. Verification of something that a user possesses may employ a smartcard or some other form of hardware token. Verification of a user characteristic might employ a biometric input, such as a fingerprint or a retinal map.

As a by-product of an authentication operation, an authentication token may be produced, and the authentication token can be transferred between entities as a form of proof of identity through the use of assertions. An authentication token provides direct evidence of a successful authentication operation and is produced by the entity that performs the authentication operation. A Kerberos token is one example of an authentication token that may be used in the present invention. More information on Kerberos may be found in Kohl et al., "The Kerberos Network Authentication Service (V5)", Internet Engineering Task Force (IETF) Request for Comments (RFC) 1510, 09/1993.

In a trust relationship, the two entities in the relationship can rely on an assertion in a communication from the other entity as being truthful. An assertion provides indirect evidence of some previous action; for example, assertions may provide indirect evidence of previous decisions or operations concerning identity, authentication, attributes, authorization decisions, and/or other types of information. A Security Assertion Markup Language (SAML) assertion is an example of an assertion format that may be used within a federated environment. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May, 31, 2002, as follows:

> The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

Various assertion formats can be translated to other assertion formats when necessary. Authentication credentials are differentiated from an authentication assertion: authentication credentials are presented by a user as part of an authentication protocol sequence with an authentication server or service, and authentication assertions are statements about the successful presentation and validation of a user's authentication credentials, which may be subsequently transferred between entities when necessary.

Through transitive trust relationships, users in a particular enterprise can leverage relationships with a set of other enterprises through that particular enterprise's participation in a federation of enterprises. Users of multiple enterprises are able to interact with those enterprises in a common manner, thereby reducing user frustration and boosting user productivity by allowing users to learn common schemes and interfaces. For example, resource management can be performed in a common manner such that users can be granted access to resources at any of the federated enterprises as if they have a direct relationship with each enterprise. As another example, different types of resources can be personalized for the user in a common manner even though the resources are provided to the user from different enterprises.

Figure 4:
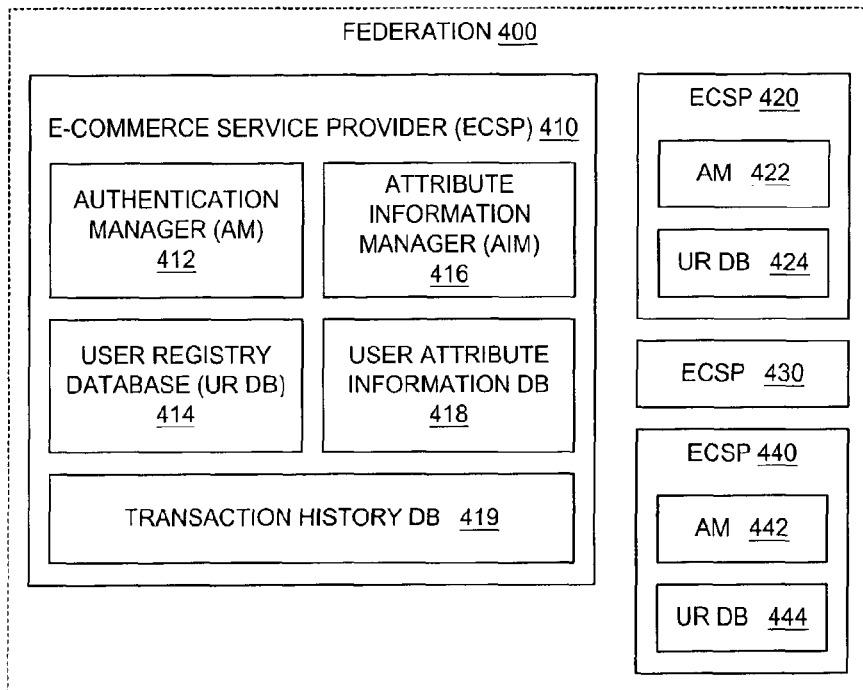
FIG. 4 is a block diagram that depicts a typical federated computing environment.

With reference now to FIG. 4, a block diagram depicts a typical federated computing environment. Since a federated computing environment is a type of computing environment, a federated computing environment can also be broadly described as comprising users and service providers. Federation 400 comprises multiple service providers. In order to facilitate the description of user transactions within a federated environment and to distinguish among various types of service providers, a particular type of service provider is primarily used within the following examples: an e-commerce service provider (ECSP). E-commerce service providers correspond to business entities that are participating in a federation; hence, it should be understood that the e-commerce service providers that are described in the following examples may represent any entity that provides a service or provides access to resources for users, which may include e-commerce entities like banks and online merchants but may include information providers or other content or service providers.

The service providers within federation 400 support a variety of functional capabilities. ECSP 410 supports authentication manager 412 for verifying the identity of users who have registered with ECSP 410 as indicated by user registry database 414. ECSP 410 also supports attribute information manager 416, which manages user attribute information that is stored in user attribute information database 418 on behalf of the registered users of ECSP 410. ECSP 410 also maintains transaction history database 419.

In a typical computing environment, a service provider requires user attribute information for a given user in order to provide some type of service for the given user. As described above with respect to FIG. 2, a service provider queries a user to obtain the required user attribute information, after which the service provider may or may not store the user attribute information. The same circumstances apply in a federated computing environment; in other words, a service provider in a federated environment may or may not have a need for user attribute information, and a service provider in a federated environment may or may not manage user attribute information by itself. In contrast with ECSP 410, ECSP 420 supports authentication manager 422 and its user registry database 424 but does not support an attribute information manager. Hence, ECSP 420 is able to provide restricted access to resources or customized user responses based upon an authenticated identity of a user but not based upon user attribute information. As an example of a more limited service provider, ECSP 430 does not support an authentication manager or an attribute information manager, whereas ECSP 440 is similar to ECSP 420 and supports authentication manager 442 and its user registry database 444.

As in a typical computing environment, a user may register at more than one service provider or federated domain within a federated computing environment. For example, a user may be registered through the user's employer, the user's ISP, or some other service provider. Registration is an operation in which a user provides identity information to a domain in order to establish a permanent relationship with the domain; thereafter, the domain recognizes the user through some form of authentication credentials. In FIG. 4, a user may register at any domain that has the capability of registering users, such as ECSP 410, ECSP 420, or ECSP 440.

A characteristic of a federated computing environment may include the fact that one of the federated domains at which a user is registered may be considered to be the user's home domain within the federated computing environment. Any federated domain that can authenticate a particular user may be termed a home domain for the user. It is possible that there may be multiple enterprises within a federated environment that could act as a user's home domain because there may be multiple enterprises that have the ability to generate and validate authentication credentials for a user. Within the scope of a given federated session, however, there is typically only one domain that is regarded as the user's home domain.

As shown in FIG. 4, since a federated domain at which a particular user has registered does not necessarily store user attribute information, the user's home domain may or may not maintain user attribute information for the user. In other words, a home domain may be able to authenticate a user but does not necessarily store any personal information or profile information for the user other than what is required to authenticate the user.

A home domain may or may not comprise any additional functionality for asserting its status as a user's home domain in comparison with other domains; in other words, the distinction as a user's home domain may be formal or informal. As a formal example, a user may obtain Internet access from a federated ISP domain, and thereafter, the ISP domain may function as the user's home domain by providing authentication assertions to other federated domains. As an informal example, a user may frequently access a Web portal that the user considers as a primary location for receiving information and conducting online transactions. In either of these cases, the domain from which the user regards as the starting location for the initiation of most of the user's transactions within the federation may be considered by the user to be the user's home domain. Alternatively, the federation may formally designate a particular registered domain as a home domain.

In addition, a federated domain may be considered to be a user's home domain for a particular purpose. Hence, a user may have concurrent specialized home domains during a particular federated session. For example, an ISP domain may act as an authentication home domain by providing authentication assertions on behalf of a user during a given federated session, i.e. vouches for the user's identity, whereas a financial service provider like a credit card company may act as a financial home domain by providing electronic funds for online purchase transactions during the same federated session.

The establishment of trust relationships between service providers may occur primarily through out-of-band processes in which the service providers engage in various types of legal agreements with respect to the duties and liabilities of each party. It should be noted that the establishment of a trust relationship between a user and a service provider may be equivalent to a registration process, although a registration process may be only a portion of a larger process that creates a trust relationship. It should also be noted that a registration process may be completely or only partially electronic. For example, a user may be required to submit paper or electronic documents to a service provider from appropriate authorities in order to establish identity or possibly to establish legitimate possession of certain information. Hence, a portion of the registration process may be done in an out-of-band process that occurs significantly prior to the completion of the registration process.

Turning now from a description of typical federated environments to a preferred federated computing environment for supporting the present invention, in brief summary, a preferred federated computing environment facilitates the maintenance of a user's attribute information at one or more locations within a federated environment and also facilitates the subsequent use of the user's attribute information from one of those locations throughout the federated environment. From a certain perspective, this functionality may be described as distributed attribute information storage. A service provider that requires a user's attribute information can identify one of these attribute storage locations and then retrieve the user's attribute information when necessary.

In a federated environment in which the present invention operates, a user can contract with one or more attribute information providers (AIPs). Attribute information providers correspond to entities which store, manage, and retrieve attribute information for other service providers on behalf of specific users. Hence, an attribute information provider is a specialized service provider which manages user attributes as a distinct service in itself. However, it should be noted that the roles of an attribute information provider and some other type of service provider can be implemented within distinct entities or within a single entity.

A user can establish and maintain a trust relationship with one or more attribute information providers such that an attribute information provider can provide the user's attribute information to other service providers within the federated environment as required, i.e. as a service. Other service providers, such as online banks or online merchants, also maintain a trust relationship with an attribute information provider such that another service provider can trust the attribute information for a user that is provided by the attribute information provider on behalf of the user.

Figure 5:
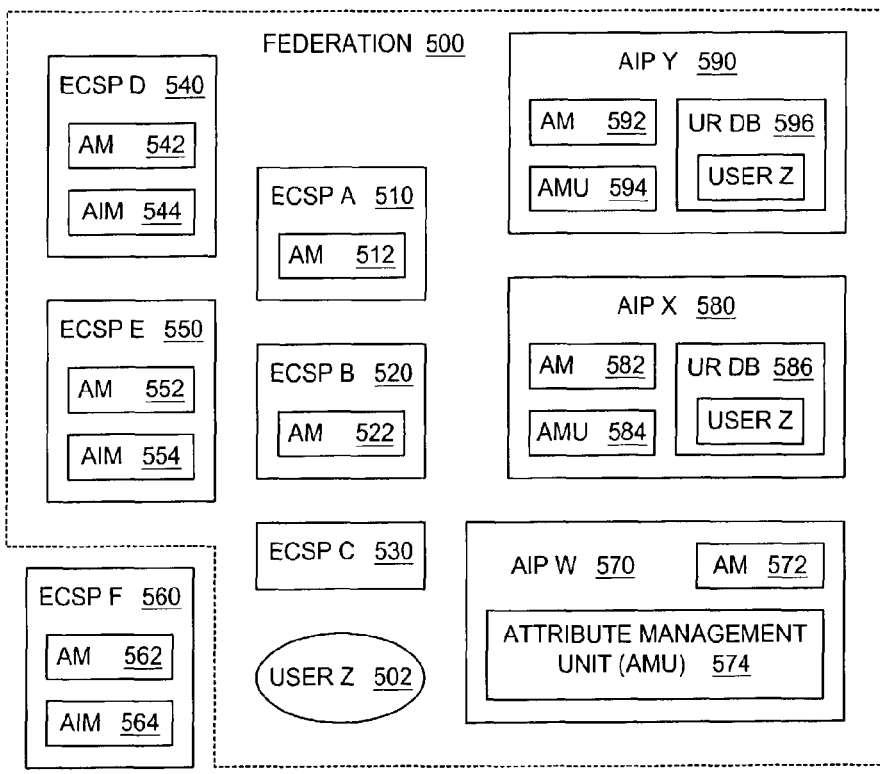
FIG. 5 is a block diagram that depicts a preferred federated environment in which the present invention may be implemented.

With reference now to FIG. 5, a block diagram depicts a preferred federated environment in which the present invention may be implemented. Federated environment 500 comprises multiple users and multiple services. The users of the federation are represented by user 502, who interacts with service providers that are inside or outside the federated computing environment through the use of a client device (not shown) in a manner similar to that described in FIGS. 1A-3.

Typical federated service providers are represented by e-commerce service providers in FIG. 5. In a manner similar to that already described above with respect to FIG. 4, these e-commerce service providers (ECSPs) may comprise the ability to authenticate both federated and non-federated users through the inclusion of an authentication manager (AM) and its associated databases. In addition, these e-commerce service providers may comprise the ability to manage user attribute information through the inclusion of an attribute information manager (AIM) and its associated databases. In the example shown in FIG. 5, ECSP 510 comprises AM 512, and ECSP 520 comprises AM 522; hence, these e-commerce service providers do not manage user attribute information. ECSP 530 comprises neither an authentication manager nor an attribute information manager. In contrast, ECSP 540 comprises AM 542 and AIM 544, and ECSP 550 comprises AM 552 and AIM 554, so these e-commerce service providers are able to perform authentication operations and to manage user attribute information for users, whether those users are considered to be federated users or non-federated users.

ECSPs 510, 520, 530, 540, and 550 are shown in FIG. 5 as participating in federation 500 because they share some type of common functionality based on previously established trust relationships. Although each and every e-commerce service provider does not necessarily have a trust relationship with every other e-commerce service provider, the e-commerce service providers have a framework or network of trust relationships that warrant their inclusion in federation 500. In contrast, ECSP 560 comprises AM 562 and AIM 564 in order to be able to perform authentication operations and to manage user attribute information for users, but ECSP 560 is not included within federation 500 because it does not have any previously established trust relationships with any other service providers within federation 500. In the example of FIG. 5, user 502 is shown as included within federation 500 because user 502 has at least one trust relationship with at least one service provider within federation 500, although user 502 may interact with federated and non-federated service providers.

The differences between a typical federated computing environment as shown in FIG. 4 and a federated computing environment as shown in FIG. 5 in which the present invention may be deployed are apparent with respect to FIG. 5, which depicts a set of attribute information providers. As mentioned above, a user can contract with one or more attribute information providers in a federated environment, and the attribute information providers (AIPs) manage user attributes as a distinct service in itself, although this service may be offered in conjunction with other services by single enterprise. Compared with federation 400 in FIG. 4, federation 500 in FIG. 5 comprises attribute information providers as distinct service providers.

In particular, AIP 570 comprises AM 572 and attribute management unit (AMU) 574. An attribute management unit includes any supporting databases, such as user registry databases (not shown), and it is similar to the attribute information managers that are supported by the federated e-commerce service providers, but an attribute management unit also includes additional functionality for performing the operations of the present invention as described in more detail further below.

Federation 500 also includes AIP 580, which supports AM 582 and AMU 584 in a manner similar to AIP 570. In the example shown in FIG. 5, user 502 is a registered user of AIP 580, as reflected by the inclusion of information about user 502 in user registry database 586 that is managed by AIP 580. The establishment of a trust relationship between an attribute information provider and a user would be primarily an out-of-band process by which the user registers or subscribes with an attribute information provider that stores, maintains, and releases the user's attribute information. In this example, user 502 has previously contracted with AIP 580 to establish a trust relationship with AIP 580 so that AIP 580 may provide user attribute information to other service providers on behalf of user 502. Likewise, AIP 590 supports AM 592 and AMU 594, which manages user attribute information for user 502 as reflected by that user's registration in user registry database 596.

A user may contract with an attribute information provider for the release of attributes in different contexts. For example, a user might require explicit user approval for the release of certain attribute information, while in other cases, the user may allow attributes to be released without requiring user intervention. These preferences may vary with the identity of the e-commerce service provider that is requesting the release of the user's attributes. An attribute information provider may store these user preferences as an attribute release policy in association with the values of the user attributes within a database that is maintained by the attribute information provider. Hence, an attribute information provider may optionally present an interface for a user to create attribute release policies when a user registers for the attribute information service or when a user updates the user's attribute information.

An e-commerce service provider may have previously established a trust relationship with at least one attribute information provider and possibly a plurality of attribute information providers, which would also be primarily an out-of-band process. An e-commerce service provider may contract for different levels of attribute information services. It should be understood that the present invention is able to interoperate with a variety of underlying attribute dissemination schemes. As part of the process of establishing a trust relationship, the e-commerce service provider and the attribute information provider would engage in an out-of-band exchange of information that is used to establish a trust relationship, which may include a shared secret key, one or more digital certificates, or some other form of information. This information is used to protect user attribute information that is presented to the e-commerce service provider by the attribute information provider during a user transaction.

As shown in the example of FIG. 5, the user may have previously established a trust relationship with a plurality of attribute information providers. As noted above, a federated service provider may be considered to be a user's home domain for a particular purpose; in other words, a user may have concurrent specialized home domains during a particular federated session, i.e. user session for one or more transactions or operations within a federated computing environment. If the user has registered with multiple attribute information providers, then one of those attribute information providers would be considered to be the user's attribute home domain for a particular federated session. Concurrently, another service provider that is providing authentication assertions on behalf of the user during the same session may be considered to be the user's authentication home domain for that session. The labeling of these different home domains may be formally supported within the federation, although the following examples use these terms more as naming conventions in order to facilitate a description of the operations that occur among many service providers or domains during the processes of the present invention that are described below with respect to the remaining figures.

Figure 6:
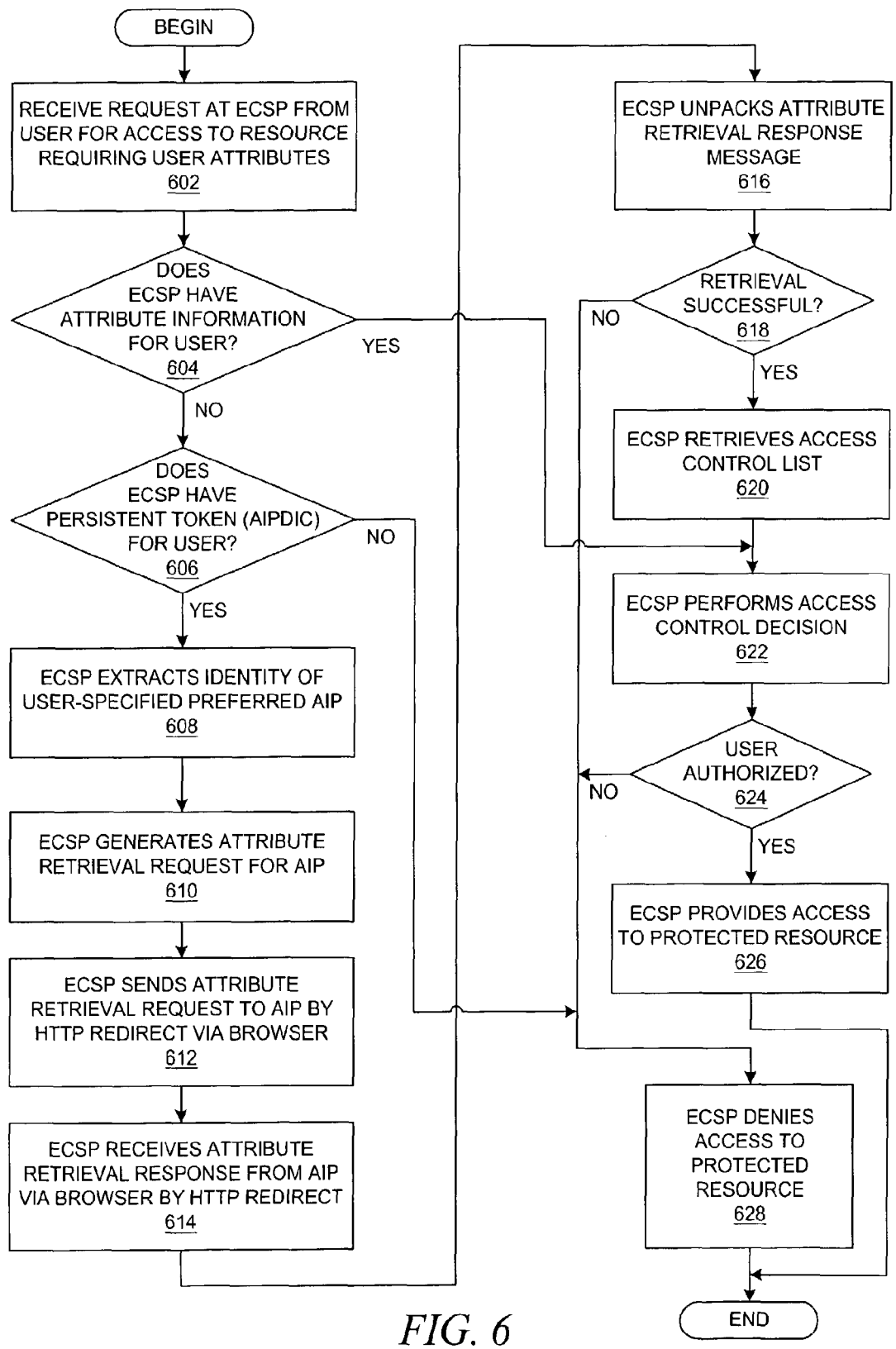
FIG. 6 is a flowchart that depicts a process by which an e-commerce service provider attempts to retrieve attribute information from an attribute information provider for a user who is attempting to access a resource at the e-commerce service provider.

With reference now to FIG. 6, a flowchart depicts a process by which an e-commerce service provider attempts to retrieve attribute information from an attribute information provider for a user who is attempting to access a resource at the e-commerce service provider. FIG. 6 shows a process that is initiated when a user requests access to a resource. In response, an e-commerce service provider decides that user attribute information is required, possibly for an access control decision, for a content personalization operation, or for some other user-specific operation. It may be assumed that the e-commerce service provider authenticates the user or obtains the identity of the user in some trustworthy manner when necessary, e.g., an authentication assertion or through a process such as that shown in FIG. 1D.

In order for the user-specific operation to be performed, the e-commerce service provider requires attribute information for the user. In the present invention, the e-commerce service provider is not required to prompt the user for attribute information, yet the e-commerce service provider may not have direct access to a user attribute information repository nor a dedicated or proprietary attribute information manager, such as those shown in FIG. 2, that may be storing and maintaining the attribute information. Moreover, the e-commerce service provider desires to minimize the number of information requests that are sent to the user.

Instead, in accordance with the use and advantages of the present invention, the e-commerce service provider attempts to retrieve user attribute information from an attribute information provider that acts in place of a domain's dedicated or proprietary attribute information manager. In accordance with the present invention, a user has an ability to direct the attribute information retrieval operation to one of potentially many attribute information providers.

The process in FIG. 6 begins with an e-commerce service provider receiving a request from a user for access to a resource for which the e-commerce service provider needs to perform a user-specific operation (step 602). As noted above, user-specific operations may include content personalization operations, access control decisions, i.e. authorization decisions, or other types of operations. The following examples depict access control decisions, but it should be understood that the present invention is applicable to a variety of user-specific operations that require user attribute information. For example, a Web page can be customized to include a weather report for the region that corresponds to the user's residence address that is stored as part of the user's attribute information. This step may be necessary only for those situations in which additional attributes are required for a user-specific response; there may be other cases in which the e-commerce service provider does not require such information, e.g., serving non-customized Web pages.

A determination is then made as to whether or not the e-commerce service provider already has attribute information for the user, possibly cached from a previous transaction (step 604). It should also be noted that the methods of the present invention could be implemented along with other methods for handling user attributes, and the operations for different attribute storage methods could be merged in some manner that requires multiple checks for user attribute storage from different locations or services, which could be accommodated at step 604. For example, the e-commerce service provider may maintain user attribute storage for certain customers who have permitted the e-commerce service provider to maintain personal information, possibly instead of and/or in addition to using an attribute information provider.

If the e-commerce service provider does not have attribute information for the user, then the e-commerce service provider determines whether or not it possesses or can retrieve an AIP domain identity token for the user (step 606). The AIP domain identity token (identified as AIPDIC in the figure) for a particular user would contain information that identifies one or more attribute information providers that manage user attribute information for the particular user. Hence, the e-commerce service provider may possess an AIP domain identity token for the user because it may have been received in the form of an HTTP cookie from the user's browser as part of an associated HTTP request. Alternatively, the e-commerce service provider may retrieve the AIP domain identity token for the user from a datastore, such as a server-side user registry database, which implies that the e-commerce service provider has previously authenticated the user to determine the identity of the user.

If the e-commerce service provider determines that it has an AIP domain identity token for the user, then the e-commerce service provider extracts the identity of an attribute information provider from the AIP domain identity token (step 608) and generates an attribute retrieval request message for the indicated attribute information provider (step 610). The attribute retrieval request message indicates a set of user attributes to be retrieved from the indicated attribute information provider. This set of user attributes may be a full set or a subset of user attributes that are required by the e-commerce service provider to complete a response to the resource request from the user. Rather than request a full set of user attributes from only one attribute information provider, the requested e-commerce service provider may optionally determine to use more than one attribute information provider whereby the e-commerce service provider requests a subset of user attributes from each of the multiple attribute information providers.

The e-commerce service provider sends the attribute retrieval request message to the appropriate attribute information provider using HTTP redirection via the user's browser (step 612). An application that is providing the functionality for the e-commerce service provider could be implemented with an event queue such that messages can be sent and received asynchronously; after sending the attribute retrieval request message, the application would not have to wait for the return of a corresponding attribute retrieval response message because the application could perform other actions during this time period.

Given the scenario described with respect to steps 602-612, one can understand the effectiveness of operations within the federation. Although the e-commerce service provider does not already have attribute information for the user, most likely because the user is initiating a new session with the e-commerce service provider, the e-commerce service provider can attempt to obtain attribute information for the user from the user's indicated attribute information provider. Since an AIP-enrollment process already established the identity of an attribute information provider for the user in some manner with the e-commerce service provider through the use of a persistent AIP domain identity token, the user has not been asked to provide the identity of an attribute information provider directly to the e-commerce service provider during this particular session.

The examples of the present invention that are shown in the figures employ HTTP redirection via the user's browser to exchange information between entities, such as an attribute information provider and a requesting e-commerce service provider. However, it should be noted that the present invention may be conducted over a variety of communication protocols and is not meant to be limited to HTTP communications. Moreover, the entities may communicate directly when necessary; messages are not required to be redirected through the user's browser.

Continuing with the example, at some point in time, the e-commerce service provider receives the attribute retrieval response message from the attribute information provider using HTTP redirection via the user's browser (step 614). The e-commerce service provider unpacks the attribute retrieval response message (step 616) and examines it to determine whether the attribute retrieval operation was successfully completed (step 618). If so, then the e-commerce service provider retrieves an access control list (step 620) and initiates the access control decision operation (step 622). A determination is made as to whether or not the user is authorized (step 624), and if the result of the access control decision is positive, i.e. the user is authorized, then the e-commerce service provider provides access to the protected resource (step 626), and the process is complete. If the attribute retrieval operation was not successfully completed at step 618, then the e-commerce service provider denies access to the protected resource (step 628), and the process is complete.

It should be noted that, in some cases, an e-commerce service provider or other type of domain may have direct access to an attribute information manager that may provide the user's attribute information. For example, a domain may maintain user attribute information for many users in server-side storage. Referring again to step 604, if the e-commerce service provider already has attribute information for the user, then the process branches to step 622 in which the e-commerce service provider immediately performs an access control decision. This scenario may also occur, for example, when the user has already accessed the same or a similar controlled resource at the e-commerce service provider, after which the e-commerce service provider may have cached the user's attribute information.

It should also be noted that FIG. 6 depicts the use of a single attribute information provider. However, the framework of the federation may be implemented to support the use of multiple user-specified attribute information providers, as explained in more detail further below with respect to FIG. 7.

FIG. 6 illustrates how a user may attempt to access a resource at an e-commerce service provider and how the e-commerce service provider may need user attribute information to perform a user-specific operation. Referring again to step 606, the e-commerce service provider determines whether it has a persistent AIP domain identity token for the user. The AIP domain identity token contains identity information for an attribute information provider that can retrieve user attribute information in response to a request from the e-commerce service provider. The e-commerce service provider might possess an AIP domain identity token for the user, such as a persistent HTTP cookie, because one could have been previously established through an AIP-enrollment operation. However, if the e-commerce service provider does not have an AIP domain identity token for the user, then the e-commerce service provider may deny access to the requested resource at step 628.

It should be noted that it is possible for the e-commerce service provider to independently interact with the user while also implementing the present invention, such as authenticating the user and prompting the user to provide information about the identity of any attribute information providers at which the user stores his/her attribute information or prompting the user to provide the required attribute information directly to the e-commerce service provider at step 604. However, these actions would not have the advantages that are provided through the present invention. A goal of the present invention is to allow the user to act within a federated environment more efficiently by having to overcome fewer information barriers. Hence, it is preferable within the federated environment for an e-commerce service provider to be able to rely on the existence of an AIP domain identity token; information about the identity of any attribute information providers at which the user stores his/her attribute information can be obtained from the persistent AIP domain identity token, thereby reducing the burdens on the user to provide the information.

However, before an e-commerce service provider may rely on the existence of a persistent AIP domain identity token to provide the identity of an attribute information provider from which to retrieve a user's attribute information, the AIP domain identity token must be established in some manner, such as pre-establishing this information via AIP-enrollment operations. A user may enroll the identity of a user's attribute information provider at a given e-commerce service provider, which then stores the information in an AIP domain identity token that will be available to the e-commerce service provider. The establishment of an AIP domain identity token can be established through many different processes, particularly AIP-enrollment processes in which the user approves of the persistent storage of the user's AIP information, i.e. identifiers for the attribute information providers that are managing the user's attribute information on behalf of the user. These enrollment processes are described in more detail in U.S. Ser. No. 10/334,326, filed Dec. 31, 2002, titled "Method and system for user enrollment of user attribute storage in a federated environment".

Figure 7:
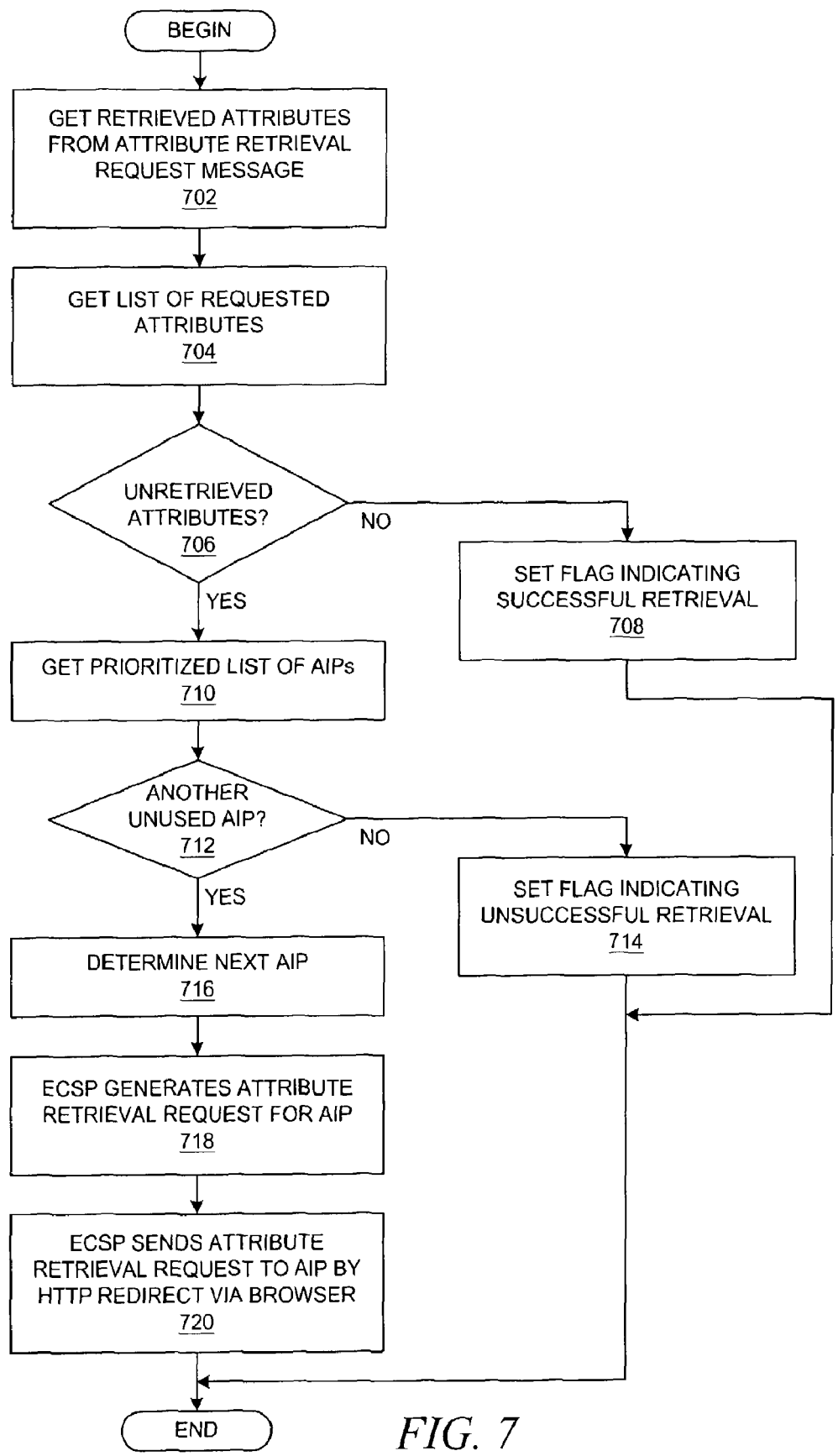
FIG. 7 is a flowchart that depicts a subprocess by which an e-commerce service provider attempts to retrieve attribute information from multiple prioritized attribute information providers for a user who is attempting to access a resource at the e-commerce service provider.

With reference now to FIG. 7, a flowchart depicts a subprocess by which an e-commerce service provider attempts to retrieve attribute information from multiple prioritized attribute information providers for a user who is attempting to access a resource at the e-commerce service provider. FIG. 7 depicts a subprocess that may be performed in conjunction with the process that is shown in FIG. 6. Step 618 in FIG. 6 examines the response message that has been returned by an attribute information provider in order to determine whether the attribute retrieval operation was successfully completed. In this manner, the process that is shown in FIG. 6 takes an all-or-none approach. This all-or-none approach in evaluating the retrieval operation may be useful in some environments. However, an attribute information provider may return various status codes that indicate a range of success in obtaining the requested attributes. Hence, the e-commerce service provider can review whether any attributes have been successfully retrieved and then determine its next action, as explained in more detail with respect to FIG. 7.

Referring to FIG. 7, after the e-commerce service provider has received and examined an attribute retrieval request message from an attribute information provider, e.g., as shown in steps 614 and 616 in FIG. 6, the e-commerce service provider gets a list of zero or more retrieved attributes from the attribute retrieval request message (step 702). After reading the list of attributes that were previously requested by the e-commerce service provider (step 704), the list of requested attributes and the list of retrieved attributes are compared to determine if there were any attributes that were not successfully retrieved (step 706). Alternatively, the e-commerce service provider may be able to make this determination solely from the information that was returned by the attribute information provider within the attribute retrieval request message.

If there were no un-retrieved attributes at step 706, i.e. all of the requested attributes were retrieved by the most recently contacted attribute information provider, then a processing flag is set to indicate that the attribute retrieval operation was successful (step 708), and the subprocess is complete. In this case, there is no need to contact another attribute information provider because the e-commerce service provider has all of the attributes that it requires for its user-specific operation.

If there are some attributes that have not been retrieved, the e-commerce service provider does not necessarily have to fail the attribute retrieval operation for the current transaction. The process that is shown in FIG. 6 was described above as if the e-commerce service provider could only contact one attribute information provider to retrieve the attributes for the user. However, there may be multiple attribute information providers that are associated with the user who initiated the original resource request. At steps 606 and 608 in FIG. 6, rather than the persistent AIP domain identity token only containing the identity of a single preferred attribute information provider, the AIP domain identity token may contain a prioritized list of multiple preferred attribute information providers. In other words, after the e-commerce service provider has attempted to retrieve attributes from a single attribute information provider, the e-commerce service provider may have additional attribute information providers from which it may attempt to retrieve the user's attribute information.

Hence, if there are some attributes that have not yet been retrieved, then the e-commerce service provider gets the prioritized list of attribute information providers for the user (step 710). A determination is made as to whether or not there are any other attribute information providers that have not yet been contacted to retrieve the user's attribute information (step 712). If not, then a processing flag is set to indicate that the attribute retrieval operation was unsuccessful (step 714), and the subprocess is complete. In this case, the e-commerce service provider cannot contact another attribute information provider because the e-commerce service provider has already contacted all of the attribute information providers that are associated with the user.

If there is at least one attribute information provider that has not yet been used in an attempt to retrieve the attributes, then the e-commerce service provider gets the name or identity of the next attribute information provider in the list (step 716). In a manner similar to that shown in steps 612 and 614 in FIG. 6, the e-commerce service provider generates an attribute retrieval request message that contains the names of the attributes that have not yet been retrieved (step 718) and sends the message to the appropriate attribute information provider by HTTP redirection via the user's browser (step 720), thereby completing the subprocess temporarily. Using a list of attribute information providers, the subprocess that is shown in FIG. 7 may be invoked multiple times; in this manner, the subprocess that is shown in FIG. 7 may be viewed as being an extension to the processing that is performed between steps 616 and 618 in FIG. 6.

In most scenarios, the list of user attributes that was most recently requested by the e-commerce service provider is most likely the list of attributes that is required by the e-commerce service provider to complete a requested transaction or user-specific operation. However, as noted above, the e-commerce service provider may have determined to request only a subset of the user attributes that are required to respond to the user's resource request. If the e-commerce service provider has previously determined to use more than one attribute information provider, then the e-commerce service provider would continue to retrieve unrequested user attributes from other attribute information providers. In other words, even if an attribute information provider returns all of the requested attributes, there may be additional attributes that are un-retrieved. The e-commerce service provider would subsequently add all or a subset of the unrequested user attributes to the list of attributes that have not yet been retrieved. In this manner, the e-commerce service provider does not necessarily request all un-retrieved attributes in the next attribute retrieval request message.

The description of the remaining figures is focused on particular aspects of the present invention. The present invention may be implemented within a preferred federated environment as described with respect to FIGS. 5-7 above. FIG. 5 shows a preferred federated environment, and FIG. 6 and FIG. 7 depict preferred processes for retrieving attribute information from either one or multiple attribute information providers when a user initiates a transaction at the e-commerce service provider. The remaining figures depict processes for allowing a user to control dissemination of the user's attribute information.

In particular, after a user has initiated a transaction at an e-commerce service provider, the e-commerce service provider obtains an identifier of an attribute information provider for the user that is initiating the transaction, e.g., via an AIP domain identity token for the user, if the e-commerce service provider requires user attribute information to complete the transaction. The e-commerce service provider sends a request to the attribute information provider to retrieve the user's attribute information.

However, during the retrieval of the user's attribute information, various processing options may present themselves, and the attribute information provider may require direct communication with the user. For example, an attribute information provider may support policies in which a user must confirm the release of certain information. As another example, the attribute information provider may determine that it is not currently storing the requested user attribute information for the user. The present invention supports a processing environment in which an attribute information provider may directly communicate with the user during a transaction prior to responding to the request from the e-commerce service provider, as described in more detail below.

Figure 8A:
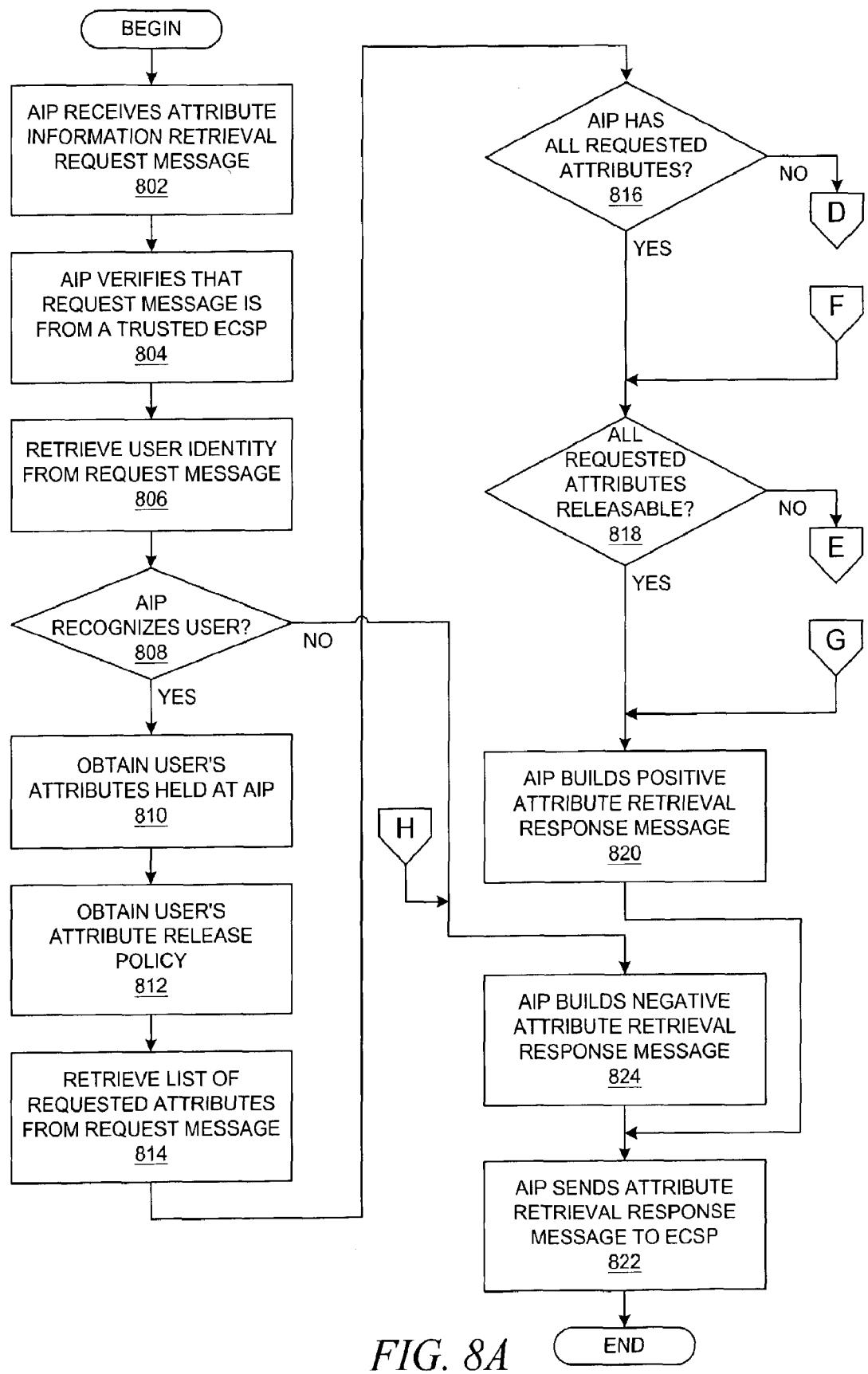
FIGS. 8A-8C contain a set of flowcharts that depicts a process by which an attribute information provider determines whether or not it can or should provide attribute information for a user at the request of an e-commerce service provider.
Figure 8B:
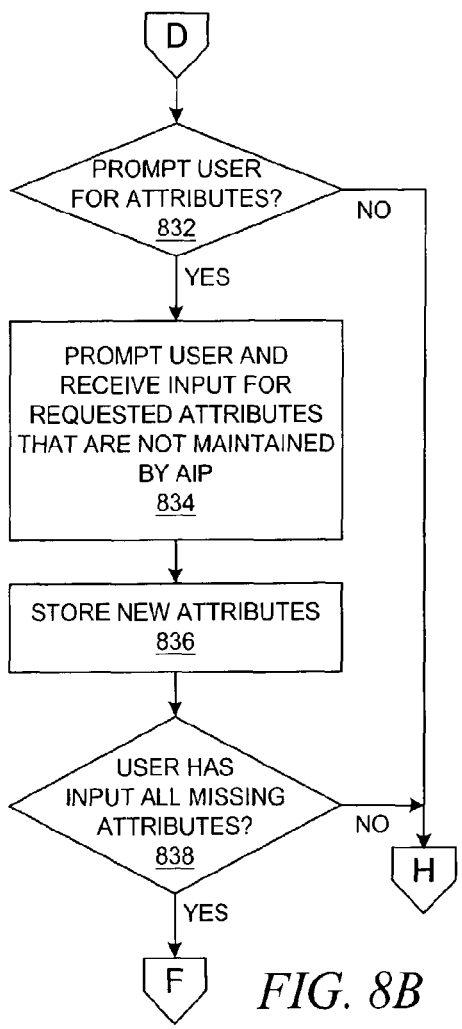
Figure 8C:
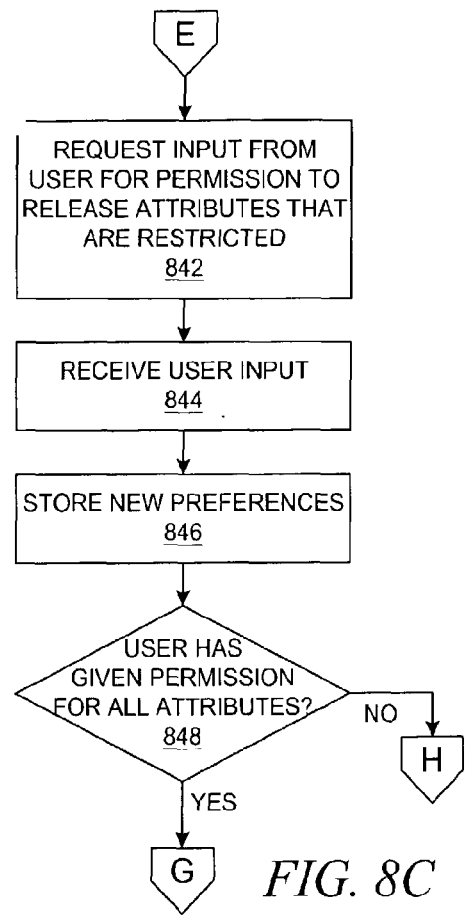

With reference now to FIGS. 8A-8C, a set of flowcharts depicts a process by which an attribute information provider determines whether or not it should provide attribute information for a user at the request of an e-commerce service provider. The flowcharts in FIGS. 8A-8C show a set of processes that may occur at the attribute information provider when an e-commerce service provider sends an attribute retrieval request message to the attribute information provider as described above in FIG. 6.

Referring to FIG. 8A, the process begins when an attribute information provider receives an attribute retrieval request message from an e-commerce service provider for a given user via HTTP redirection through the user's browser (step 802). The attribute information provider verifies that the attribute retrieval request message is from a trusted e-commerce service provider (step 804). If not, then the attribute information provider may ignore the message or return an error message.

A user identity is retrieved from the attribute retrieval request message (step 806), and a determination is made as to whether or not the user is recognized by the attribute information provider (step 808). The e-commerce service provider and the attribute information provider may be able to exchange and interpret a user's identity based on a common identity management scheme within a federation.

If the user is not recognized, then the process branches and returns an error message. If the user identity is recognized, then the attribute information provider maintains some type of user account or user profile for the identified user. The identified user's attributes are retrieved from a database maintained by the attribute information provider (step 810), preferably along with the identified user's attribute release policy (step 812); in other embodiments, the management of attributes may not be restricted through release policies. The list of requested attributes is obtained from the attribute retrieval request message (step 814), and the attribute information provider can then begin to determine whether or not any attributes should be returned in response to the request from the e-commerce service provider.

A determination is made about whether or not the attribute information provider is currently maintaining all of the user attributes that were requested by the e-commerce service provider (step 816). If not, the process branches to the sub-process shown in FIG. 8B. If the attribute information provider is currently maintaining all of the user attributes that were requested by the e-commerce service provider, then a determination is made about whether or not all of the user attributes are releasable by the attribute information provider to the e-commerce service provider (step 818). If not, the process branches to the subprocess shown in FIG. 8C. If all of the user attributes are releasable by the attribute information provider to the e-commerce service provider, then the attribute information provider has determined that it has all of the requested attributes and that all of the user attributes are releasable to the e-commerce service provider. Hence, the attribute information provider builds a positive attribute retrieval response message containing the requested user attributes (step 820) and sends the attribute retrieval response message to the e-commerce service provider via HTTP redirection through the user's browser (step 822), thereby completing the process.

It should be noted that other methods may be employed to return the attributes from the attribute information provider to the requesting e-commerce service provider. For example, rather than returning copies of the attributes within an attribute retrieval response message, the attribute information provider may return a message that contains only a pointer to the attributes in the form of a resource name or resource identifier; the e-commerce service provider would use the pointer to retrieve the attributes. The pointer could be securely transmitted between the attribute information provider and the e-commerce service provider through mutually authenticated SSL to protect the pointer from unwanted disclosure, thereby ensuring that only the e-commerce service provider is able to use the pointer. The method of returning only a pointer is particularly useful if large amounts of user attribute information must be transmitted and there are communication protocol constraints that limit the amount of data that can be transmitted at any one time.

Referring again to step 808, if the user identity in the attribute retrieval request message was not recognized by the attribute information provider, then the attribute information provider builds a negative attribute retrieval response message (step 824) and sends the attribute retrieval response message to the e-commerce service provider via HTTP redirection through the user's browser at step 822. The use of the terms "positive response" and "negative response" are relative, and as explained in more detail further below, the present invention supports a range of partial responses and various types of returned status.

At step 816, if the attribute information provider is not currently maintaining all of the user attributes that were requested by the e-commerce service provider, then the process branches to FIG. 8B.

Referring to FIG. 8B, the attribute information provider may request input from the user to provide user attribute information for the requested attributes that the attribute information provider is not currently maintaining.

A determination is made as to whether or not the attribute information provider should prompt the user for attribute information (step 832). If not, then the process branches back to step 824 in FIG. 8A to return a negative attribute retrieval response message.

The decision as to whether or not to prompt the user may be completed in accordance with one or more processing flags that are available to the attribute information provider. For example, when a user's account is set up at the attribute information provider, such as when a user registers for the service, the user may have been presented with an option that indicates whether or not the attribute information provider should prompt the user at the appropriate time for any attribute information that is not currently maintained by the attribute information provider.

This type of option is advantageous for the following reasons. As depicted in FIG. 8B, when an attribute information provider is retrieving the user's attribute information at the request of an e-commerce service provider, there may be many occasions when the attribute information provider discovers that it is not maintaining certain user attribute information, thereby generating many user prompts. Over time, it may be expected that such occasions would diminish as more information is managed by the attribute information provider.

However, if the user manages his or her user attribute information at multiple attribute information providers, there may be many such occasions across many attribute information providers. Over time, the user may become aggravated with responding to many prompts for user attribute information.

With the availability of an option that indicates that the attribute information provider should prompt the user for missing attribute information, the user might select this option if the user considers the attribute information provider to be the user's primary attribute information provider among a set of attribute information providers. If this option is selected by the user, then it may be expected that the attribute information provider would eventually maintain much or all of the user's attribute information, although the user has the choice as to what user attribute information is given to the attribute information provider. This expectation is reasonable because the user would be repeatedly prompted to provide user attribute information whenever necessary.

However, the user might decline this option if the user considers the attribute information provider to be a less important attribute information provider, thereby limiting storage of certain attribute information at particular attribute information providers. In addition, the user might decline this option to limit the number of times that the user would be prompted for the information by different attribute information providers, i.e. to reduce the amount of nuisance prompting.

As another example of the manner in which the attribute information provider may employ a processing flag with respect to prompting the user, the e-commerce service provider that originated the attribute information retrieval message could set a flag within the message to inform the attribute information provider whether it should prompt the user. Since the e-commerce service provider should know whether or not it will contact other attribute information providers while attempting to retrieve a particular user's attribute information, the e-commerce service provider can inform the attribute information provider whether or not to prompt the user for any attributes that the attribute information provider is not currently maintaining. For example, the e-commerce service provider might set this flag when the e-commerce service provider is sending an attribute retrieval request message to the last attribute information provider in the set of multiple attribute information providers for the user. In this manner, the last attribute information provider in the set would prompt the user as a last resort to obtain the attribute information that might be required to complete a given transaction.

Alternatively, the e-commerce service provider could set a flag within the attribute information retrieval message that indicates that the attribute information provider that receives the message is the last attribute information provider that will be contacted by the e-commerce service provider. In this case, the attribute information provider is not being told to prompt the user. Instead, the attribute information provider may use the flag as part of its own determination as to whether or not to prompt the user. Other optional flags could also be included in messages between the e-commerce service provider and an attribute information provider.

Referring again to FIG. 8B, if the attribute information provider should prompt the user for additional attribute information, then after requesting and receiving user input (step 834) and storing any newly provided user attribute information (step 836), a determination is made as to whether or not the attribute information provider now has all of the user attributes that were requested by the e-commerce service provider (step 838). In other words, the user may have refused to provide some of the user attribute information. If the attribute information provider has all of the requested attributes, then the process branches back to step 818 in FIG. 8A to determine whether the attributes may be released. If the attribute information provider does not have all of the requested attributes, then the process branches back to step 824 in FIG. 8A to return a negative attribute retrieval response message.

Referring again to FIG. 8A, if not all of the attribute information is releasable at step 818, then the process branches to FIG. 8C.

Referring to FIG. 8C, the attribute information provider requests input from the user to indicate permission for the attribute information provider to release any requested attributes that have release restrictions (step 842). In other words, the attribute information provider asks the user whether or not the user wants to release any attributes that were requested by the e-commerce service provider and that the user previously restricted, possibly through the user of an attribute release policy. After receiving user input (step 844) and storing any modified restrictions or permissions for the attributes (step 846), the attribute information provider determines whether the user has permitted the release of all of the requested attributes (step 848). If so, then the process branches back to step 820 in FIG. 8A to return a positive attribute retrieval response message, and if not, then the process branches back to step 824 in FIG. 8A to return a negative attribute retrieval response message.

As shown in FIGS. 8A-8C, at some point in time, the attribute information provider constructs and returns a response message to an e-commerce service provider, as described with respect to steps 820-824 in FIG. 8A. The processes that are shown in FIGS. 8A-8C operate as if the attribute information provider either successfully returns all of the requested attributes or fails. For example, a positive response message is generated at step 820 only if the attribute information provider has all of the requested attributes and only if the attribute information provider can release all of the requested attributes. In all other cases, a negative response message is generated at step 824.

Figure 8D:
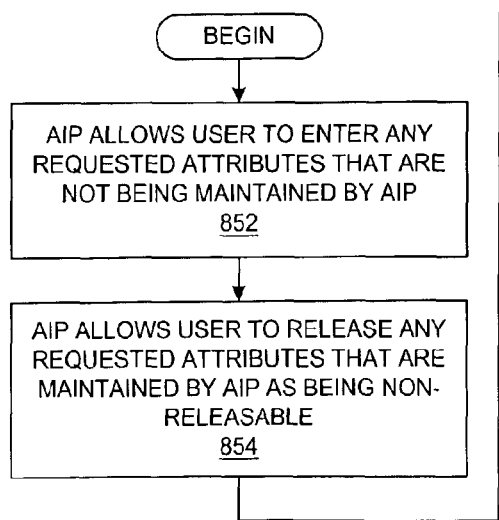
FIGS. 8D-8E contain a set of flowcharts that depict a process by which an attribute information provider generates a response message to be sent to an e-commerce service provider that has requested the retrieval of attributes for a particular user.
Figure 8D:
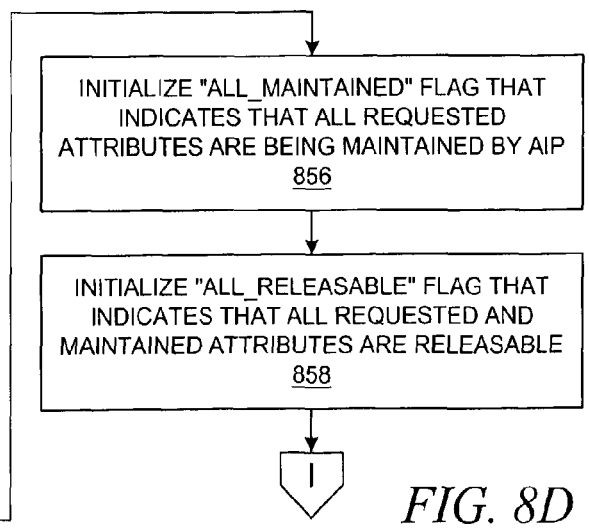
Figure 8E:
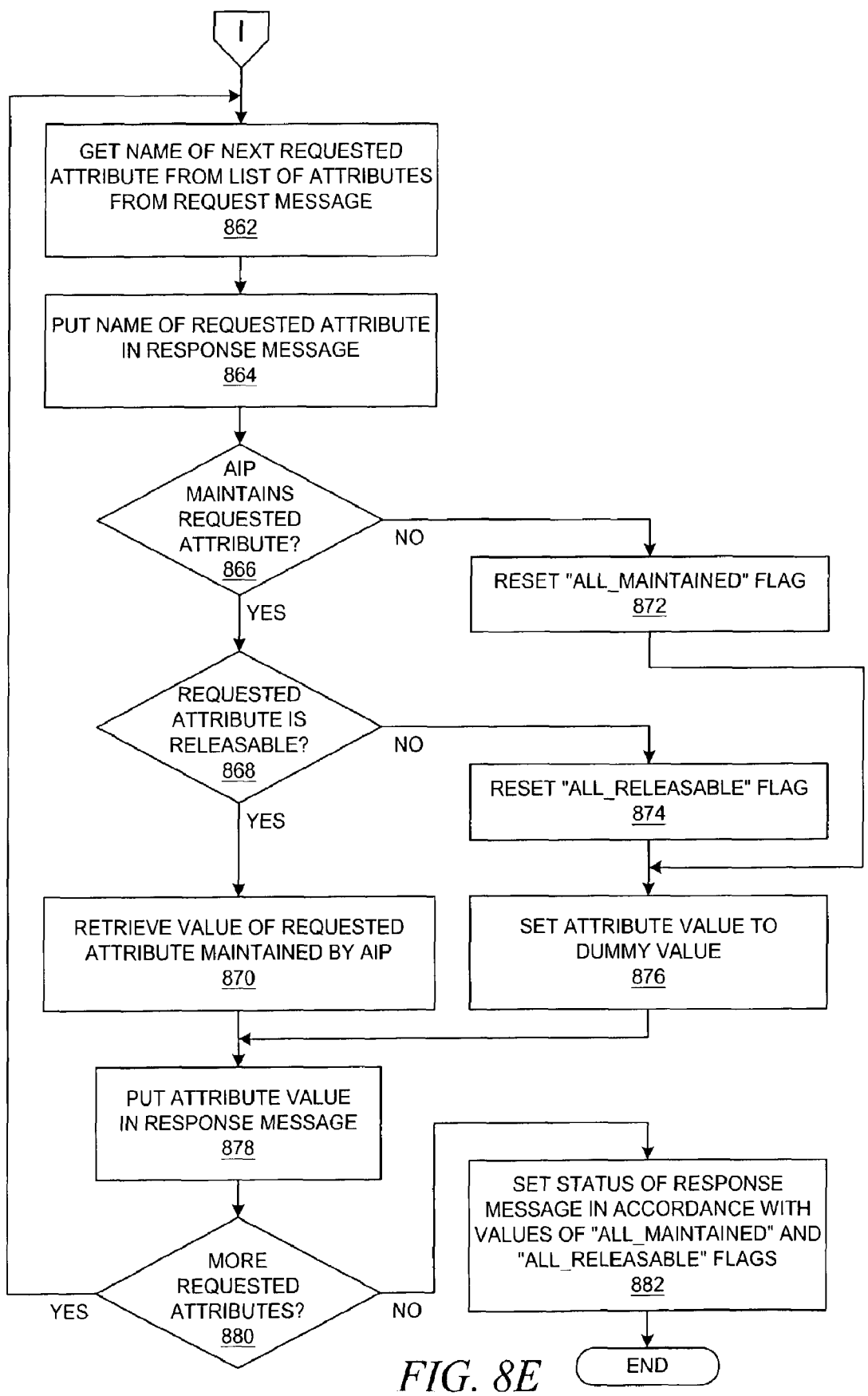

This all-or-none approach in reporting the status of the retrieval operation may be useful in some implementations of the present invention. In other implementations of the present invention, the attribute information provider may return various status codes that indicate a range of success in obtaining the requested attributes. For example, various positive status codes may be returned even if the attribute information provider has been able to retrieve only some of the requested attributes. A status code for complete failure might be used if the attribute information provider does not maintain any of the requested attributes or if the attribute information provider cannot release any of the requested attributes that it does maintain. After the requesting e-commerce service provider receives the response message, the e-commerce service provider can review whether any attributes have been successfully retrieved and then determine its next action, such as attempting to obtain the remaining attributes, as described above with respect to FIG. 7. FIGS. 8D-8E depict an example of a process that might be used by an attribute information provider to report partial success in retrieving attributes.

The present invention may be implemented independently from any particular format of the request messages and response messages. The positive and negative attribute retrieval response messages may have similar data structures. The response messages may be encrypted to protect the user's attribute information. It should also be noted that, in both cases, the attribute information provider may insert dummy information or otherwise mask the contents of the response message in order to prevent a snooper from being able to differentiate successful and unsuccessful responses; for example, a series of intercepted unsuccessful messages may still provide information about the system's ability to obtain attribute information.

With reference now to FIGS. 8D-8E, a set of flowcharts depict a subprocess by which an attribute information provider generates a response message to be sent to an e-commerce service provider that has requested the retrieval of attributes for a particular user. The subprocess that is shown in FIGS. 8D-8E may be used to generate a response message that returns only some of the attributes that have been requested by an e-commerce service provider. Hence, the subprocess that is shown in FIGS. 8D-8E may be used instead of FIGS. 8B-8C and steps 816-820 and 824 in FIG. 8A. It should be noted, however, that the processes in the flowcharts are only examples of the present invention and should not be interpreted as exclusive embodiments.

Referring to FIG. 8D, the subprocess begins by allowing the user to enter any requested attributes that are not currently being maintained by the attribute information provider (step 852). The subprocess continues by allowing the user to select options that release any requested attributes that are being maintained by the attribute information provider as non-releasable attributes (step 854), e.g., attributes that require explicit approval by the user before the attributes can be released as indicated in an attribute release policy. Steps 852 and 854 essentially repeat the functionality shown in FIG. 8B and FIG. 8C.

As the response message is being generated, a set of processing flags can be used to track the progress in obtaining the requested attributes. In this example, two processing flags are used: an "ALL_MAINTAINED" flag is initialized (step 856) to track whether the attribute information provider has all of the requested attributes, and an "ALL_RELEASABLE" flag is initialized (step 858) to track whether the attribute information provider can release all of the requested attributes.

The subprocess then loops through the list of requested attributes that have been retrieved from the attribute retrieval request message at step 814 in FIG. 8A. The name of the next requested attribute that should be processed is read from the list (step 862), and although the attributes might not be required to be processed in any particular order, the name of the attribute is written into the response message (step 864). A determination is then made as to whether the attribute information provider maintains the attribute (step 866). If so, then a determination is made as to whether the attribute information provider can release the requested attribute (step 868). If so, then the value of the attribute is retrieved (step 870).

If the attribute information provider does not have a requested attribute at step 866, then the "ALL_MAINTAINED" flag is reset (step 872). If the attribute information provider cannot release a requested attribute at step 868, then the "ALL_RELEASABLE" flag is reset (step 874). In either of these cases, a dummy value is assigned to the requested attribute (step 876).

The attribute value or the assigned dummy value is then written into the response message (step 878). A determination is made as to whether there are more attributes in the list of requested attributes that have not yet been processed (step 880), and if so, then the subprocess branches back to step 862 to obtain the next requested attribute.

If there are no more unprocessed attributes in the list, then the status of the response message is set in accordance with the values of the processing flags (step 882). For example, if either the "ALL_MAINTAINED" flag or the "ALL_RELEASABLE" flag are not set, then at least one attribute has not been retrieved as requested, and an appropriate status code can be chosen for the response message. The subprocess is then complete, after which it may branch back to the main process to send the response message to the e-commerce service provider.

With reference now to FIG. 9A, a graphical user interface window is presented to a user by an attribute information provider that is requesting the user to input user attribute information that will be used by an e-commerce service provider within a federated environment. Window 900 is a typical browser application window that a user would have previously used to request a resource from the e-commerce service provider, i.e. to initiate some type of transaction with the e-commerce service provider. In most Web environments, the controls that are shown in window 900 would likely be presented in the form of an HTML-formatted document, i.e. a Web page, which can be presented by a browser application that is executing on a client device that is being operated by the user. Toolbar 902 contains typical controls for use within the browser application window. OK Button 904 allows a user to indicate that the user has completed the input operation, while CANCEL button 906 allows a user to cancel the pending transaction. Reset button 908 allows a user to quickly return to default values or to clear all of the input fields.

The user may see the name of the e-commerce service provider at the top 910 of the content area in window 900, which allows the user to view which service provider is completing a pending transaction. In the example shown in FIG. 9A, the attribute information provider has attempted to maintain a continuous look-and-feel throughout all of the graphical user interfaces that are seen by the user during the pending transaction. Hence, area 910 of the content area of window 900 may contains the same information that may have been seen by the user in Web pages that were presented by the e-commerce service provider at which the user is completing a transaction. This reminds the user that the e-commerce service provider is controlling the pending transaction, even though the attribute information provider has intervened temporarily to manage the user's attribute information as part of the pending transaction. In a Web browser environment, the attribute information provider could use a set of frames within an HTML document to create this appearance.

The user may want to see any pertinent privacy policies before entering or releasing user information in order to make an informed decision as to whether or not the user truly wishes to complete the pending transaction. Button 912 allows a user to view or review the privacy policy of the e-commerce service provider, while button 914 allows a user to view or review the privacy policy of the attribute information provider.

Window 900 may be presented to a user when an attribute information provider determines that it does not already have one or more attributes that are being requested by an e-commerce service provider, as described above with respect to FIG. 8B. Input fields 920-928 allow the user to input values for the requested attributes. Pairs of radio buttons 930 are associated with the input fields. Each pair of YES/NO radio buttons allows a user to specify whether a user should be prompted during future transactions for permission to release a particular attribute, thereby allowing the user to control when the attribute information provider actually releases the attribute. In alternative embodiments, other permission restrictions could be provided.

After the user attribute information is entered, the attribute information provider stores the values of the attributes so that they are available for subsequent transactions. Following the previous examples, the requested information will eventually be used for an authorization operation at the e-commerce service provider at which the user has a pending transaction.

Figure 9B:
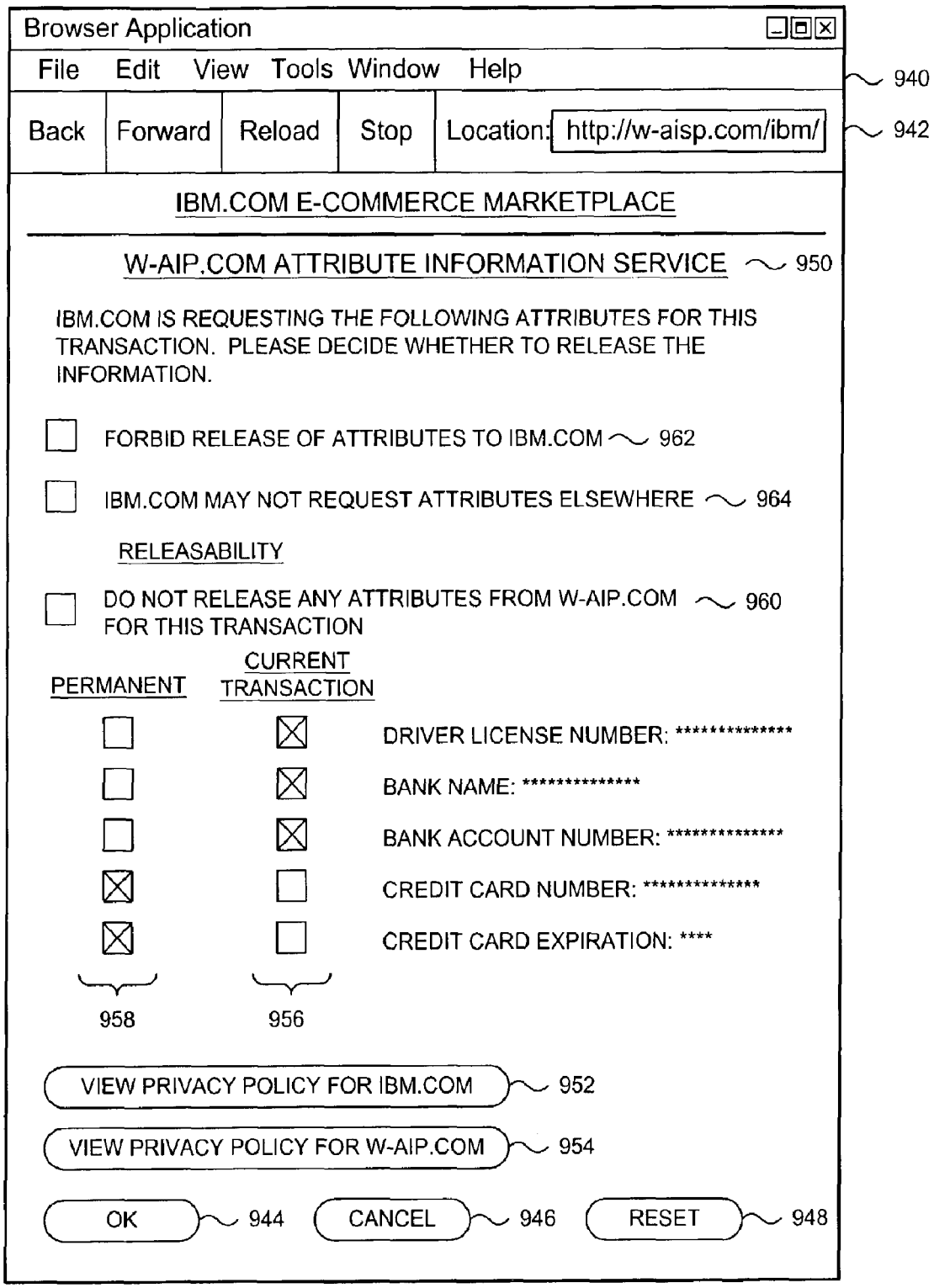
FIG. 9B is a graphical user interface window that is presented to a user by an attribute information provider that is requesting the user to release user attribute information that will be used by an e-commerce service provider within a federated environment.

With reference now to FIG. 9B, a graphical user interface window is presented to a user by an attribute information provider that is requesting the user to release user attribute information that will be used by an e-commerce service provider within a federated environment. In a manner similar to window 900 that is shown in FIG. 9A, window 940 is a typical browser application window that a user would have used to request a resource from the e-commerce service provider. Toolbar 942 contains typical controls for use within the browser application window.

OK Button 944 allows a user to indicate that the user's input is complete, while CANCEL button 946 allows a user to cancel the pending transaction. Reset button 948 allows a user to quickly return to default values or to clear all of the input fields.

In a manner similar to that described above for FIG. 9A, the attribute information provider has attempted to maintain a continuous look-and-feel throughout all of the graphical user interfaces that are seen by the user during the pending transaction. Hence, area 950 of the content area of window 940 also contains the same information as was seen by the user in window 900.

In a manner similar to that described with respect to FIG. 9A, the user may want to see any pertinent privacy policies before entering or releasing user information in order to make an informed decision as to whether or not the user truly wishes to complete the pending transaction. Button 952 allows a user to view or review the privacy policy of the e-commerce service provider, while button 954 allows a user to view or review the privacy policy of the attribute information provider.

Window 940 may be presented to a user when an attribute information provider determines that one or more attributes that are being requested by an e-commerce service provider are not releasable, as described above with respect to FIG. 8C. Although the present invention allows an attribute information provider to support a variety of restrictions, the attributes may be restricted by the user such that they can only be released after explicit authorization by the user, e.g., as indicated through the use of YES/NO radio buttons in FIG. 9A.

In addition, the user interface could provide multiple temporal restraints for each attribute, e.g., one option indicates whether the attribute is to be released for the pending transaction, and another option that indicates whether the attribute is to be permanently releasable. In the example in FIG. 9B, check boxes 956 allow the user to explicitly indicate whether the requested attributes are to be released to the e-commerce service provider for the currently pending transaction, whereas check boxes 958 allow the user to explicitly indicate whether the requested attributes are to be permanently releasable. As another alternative, the attribute information provider could associate the user's selections with a particular e-commerce service provider such that the restrictions are only applied to transactions from a particular domain. Alternatively, the attribute information provider could allow the user to manage all of the user's attributes and associated options each time that the user is presented with the need to input or change some of the attribute information.

The attribute information provider may allow the user to specify other options with respect to the releasability of the user's attribute information. For example, check box 960 allows a user to specify that no attributes should be released from the attribute information provider for the pending transaction; selection of check box 960 would disable check boxes 956 and possibly also check boxes 958.

Check box 962 allows a user to indicate that the user does not want the requested attributes to be released to the requesting e-commerce service provider at all. Alternatively, the user could be provided with an ability to specify general domain restraints, e.g., identifiers or domain names of other e-commerce service providers for which the user wishes to restrict the release of attributes.

Check box 964 allows a user to indicate that the user does not want the requesting e-commerce service provider to attempt to find the user's attribute information through any other sources, e.g., attribute information providers other than the one that is currently requesting input from the user, as might occur in the process shown in FIG. 7.

The selection of check box 962 or check box 964 may be communicated back to the requesting e-commerce service provider in some manner, e.g., through a status code or a control flag in an attribute retrieval response message. Given that the requesting e-commerce service provider preferably operates in a federated environment in cooperation with other entities in the federated environment, the e-commerce service provider would be expected to adhere to the implications of the user's choice, thereby preventing the e-commerce service provider from contacting other attribute information providers to obtain the required attribute information for the pending transaction. If the user selects check box 962, then it would be expected that the user has essentially canceled the pending transaction because the requesting e-commerce service provider will not receive any of the required attributes. If the user selects check box 964, then it would be expected that the pending transaction may fail if the requesting e-commerce service provider does not receive the required attributes from the attribute information provider that is currently requesting input from the user. Check box 964 also has the advantage of reducing the amount of nuisance prompting that the user may experience from other "downstream" attribute information providers that could have been contacted by the e-commerce service provider.

As mentioned above, an attribute information provider may return various status codes or flags to the requesting e-commerce service provider. These codes may include processing options that were stored by the attribute information provider or that were chosen by a user when the attribute information provider presented a user interface to the user to obtain user input. Referring again to FIG. 7, the flowchart illustrates a process by which an e-commerce service provider attempts to retrieve all of the attributes that are required for a pending transaction. The process shown in FIG. 7 would be expanded to handle the codes or flags that might be returned in an attribute retrieval response message.

For example, if the user selected check box 964, then the attribute information provider would set a particular restriction flag in the attribute retrieval response message. This particular restriction flag would indicate that the e-commerce service provider should not continue contacting other attribute information providers as shown in FIG. 7, after which the e-commerce service provider would continue processing the transaction as necessary, which may include failing the transaction. Other conditions, restrictions, or controls could be presented to the user and communicated back to the e-commerce service provider, which should tailor its processing in accordance with each control flag that it receives from the attribute information provider.

After the user selections are entered in window 940 in FIG. 9B, the attribute information provider stores the releasable indications, if necessary, so that they are available for subsequent transactions. If the user does not release one or more of the requested attributes, then the pending transaction may fail. Attribute information may be masked to prevent inappropriate disclosure.

Referring again to FIGS. 8B-8E, an attribute information provider may provide a user with an opportunity to input attributes and associated options, e.g., through the user interfaces that are shown in FIG. 9A and FIG. 9B. However, if the e-commerce service provider has a prioritized list of multiple attribute information providers, then the e-commerce service provider may contact a series of attribute information providers to retrieve the user's attribute information. In this case, it may be inappropriate for the attribute information provider to present the user interfaces that are shown in FIG. 9A and FIG. 9B because the e-commerce service provider has the opportunity to retrieve the user's attribute information elsewhere.

For example, if the user has attribute information stored in multiple attribute information providers, then the user may become confused during the following scenario. The user has previously selected a permanent list of prioritized attribute information providers, and the user knows that any user attribute that might be required for an online transaction is stored somewhere among the set of selected attribute information storage providers. When the e-commerce service provider sends an attribute retrieval request message to the first attribute information provider, the first attribute information provider presents a user interface for the user to input the attribute information that is not currently maintained by the first attribute information provider, and the user becomes confused and/or worried that the required attribute information was not retrieved from another attribute information provider that maintains the required information. In this scenario, the first attribute information provider has not provided the e-commerce service provider with the opportunity to contact another attribute information provider prior to prompting the user to enter the attribute information.

To avoid such scenarios, the e-commerce service provider may include a flag in the attribute retrieval request message that indicates whether or not the attribute information provider that receives the request message should prompt the user for the required information. In this manner, the e-commerce service provider may loop through a list of prioritized attribute information providers, as described above with respect to FIG. 7, while indicating that the attribute information providers should not prompt the user for any attributes that are not maintained by the attribute information provider or which the attribute information provider determines are not releasable. Rather than failing the attribute retrieval operation after contacting all of the attribute information providers, the e-commerce service provider may make another pass through the set of attribute information providers. In other words, the e-commerce service provider may send another attribute retrieval request message to the first attribute information provider and indicate that the attribute information provider should prompt the user for any attributes that are not maintained by the attribute information provider or which the attribute information provider determines are not releasable. In this manner, all of the attribute information providers are contacted prior to prompting the user for additional information as shown in FIG. 9A and FIG. 9B.

When multiple attribute information providers are supported, the entities in a federated environment may have policies that guide or determine the manner in which an entity should act in such an environment. Whether or not multiple attribute information providers are supported, the entities in a federated environment may have policies that guide or determine when a user should be prompted for information. Various constraints may be contained in a privacy policy for an attribute information provider or e-commerce service provider, or various constraints may be contained in contracts that were established when the entities entered into trusted business relationships with other entities. In other words, the options that were described as being selectable by a user may be administratively configured by the service providers, particularly in view of one or more common policies that are maintained by service providers or that are required to be enforced as part of membership within a federation.

The advantages of the present invention should be apparent in view of the detailed description of the invention that is provided above. The present invention allows a user to contract with one or more attribute information providers (AIPs). The user maintains a relationship with these attribute information providers and provides user attribute information that is stored and maintained by the attribute information providers. If the user employs more than one attribute information provider, the information that is stored may overlap, i.e. the attribute information providers do not necessarily store mutually exclusive sets of data items.

E-commerce service providers, such as online banks or online merchants, also maintain a relationship with an attribute information provider such that the e-commerce service provider can trust the user attribute information that is provided by the attribute information provider on behalf of the user. The user can visit any e-commerce service provider within a federated environment without having to establish an a priori relationship with that particular e-commerce service provider. As long as the user has a relationship with at least one attribute information provider, then the user will be able to have a simplified operation at an e-commerce service provider by not having to tediously provide all of the information that is required by the e-commerce service provider.

With the present invention, the user is not necessarily challenged for attribute information when attempting to access a protected resource at an e-commerce service provider under certain conditions. This allows some degree of free movement between domains that participate in the federated environment. The user gains some efficiency or productivity in not having to fulfill multiple informational requests, which can be barriers to free movement across Web sites.

Moreover, with the present invention, user attribute information can be permanently stored in a network in a location other than a user's client device. The user's attribute information is available to the entities in a federated environment even if the entities in the federated environment are not able to permanently store information on the user's client device, particularly when those entities are restricted from permanently storing the user's attribute information themselves, e.g., by legal restrictions or by contractual privacy policies. In addition, the present invention provides methods for maintaining user attribute information in a wireless environment in which the federated entities do not have the physical ability to store user attribute information on certain client devices, such as PDA's and mobile phones.

The present invention also supports a processing environment in which an attribute information provider may directly communicate with the user during a transaction prior to responding to the request from the e-commerce service provider. The attribute information provider can manage user attribute information in accordance with an attribute release policy containing restrictions that are determined by a user, by a service provider, by a federation, or by some other entity. Various processing options regarding the storage and management of user attribute information may be selectable by a user, after which an attribute information provider abides by the user's choices.

It is important to note that while the present invention has been described in the context of a fully functioning data processing system, those of ordinary skill in the art will appreciate that the processes of the present invention are capable of being distributed in the form of instructions in a computer readable medium. Examples of computer readable media include media such as EPROM, ROM, tape, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for managing user information within a data processing system, the method comprising:
   at a service provider, receiving from a client a request for a resource;
   selecting a set of one or more identifiers of attribute information providers in response to a determination that the service provider does not have a set of one or more identifiers of attribute information providers that was previously associated with the client or a user of the client, wherein each of the attribute information providers is a provider that maintains user attribute information for the user; and
   sending, from the service provider to a user-specified attribute information provider, an attribute information retrieval request message.

2. The method of claim 1 further comprising:
   providing a user option to choose whether to persistently associate the user with the selection of the set of one or more identifiers of attribute information providers.

3. The method of claim 2 further comprising:
   enrolling the selection of the set of one or more identifiers of attribute information providers at the service provider.

4. The method of claim 2 further comprising:
   storing the set of one or more identifiers of attribute information providers in a persistent token at the client.

5. The method of claim 2 further comprising:
   storing the set of one or more identifiers of attribute information providers in a client-side information repository.

6. The method of claim 1 further comprising:
   receiving the set of one or more identifiers of attribute information providers as input from the user.

7. The method of claim 1 further comprising:
   retrieving the set of one or more identifiers of attribute information providers from administratively configured information.

8. The method of claim 1 further comprising:
   providing a user option to choose whether to establish a relationship with an attribute information provider in the set of one or more identifiers of attribute information providers.

9. An apparatus for managing user information, the apparatus comprising:
   a processor;
   computer memory holding computer program instructions that when executed by the processor perform a method, comprising:
   at a service provider, receiving from a client a request for a resource;
   selecting a set of one or more identifiers of attribute information providers in response to a determination that the service provider does not have a set of one or more identifiers of attribute information providers that was previously associated with the client or a user of the client, wherein each of the attribute information providers is a provider that maintains user attribute information for the user; and
   sending, from the service provider to a user-specified attribute information provider, an attribute information retrieval request message.

10. The apparatus of claim 9 wherein the method further comprises:
    providing a user option to choose whether to persistently associate the user with the selection of the set of one or more identifiers of attribute information providers.

11. The apparatus of claim 10 wherein the method further comprises:
    enrolling the selection of the set of one or more identifiers of attribute information providers at the service provider.

12. The apparatus of claim 10 wherein the method further comprises:
    storing the set of one or more identifiers of attribute information providers in a persistent token at the client.

13. The apparatus of claim 10 wherein the method further comprises:
    storing the set of one or more identifiers of attribute information providers in a client-side information repository.

14. The apparatus of claim 9 wherein the method further comprises:

receiving the set of one or more identifiers of attribute information providers as input from the user.

15. The apparatus of claim 9 wherein the method further comprises:

retrieving the set of one or more identifiers of attribute information providers from administratively configured information.

16. The apparatus of claim 9 wherein the method further comprises:

providing a user option to choose whether to establish a relationship with an attribute information provider in the set of one or more identifiers of attribute information providers.

17. A computer program product in a computer readable medium for managing user information in a data processing system, the computer program product holding computer program instructions which when executed by the data processing system perform a method comprising:

at a service provider, receiving from a client a request for a resource;

selecting a set of one or more identifiers of attribute information providers in response to a determination that the service provider does not have a set of one or more identifiers of attribute information providers that was previously associated with the client or a user of the client, wherein each of the attribute information providers is a provider that maintains user attribute information for the user; and sending, from the service provider to a user-specified attribute information provider, an attribute information retrieval request message.

18. The computer program product of claim 17 wherein the method further comprises:

providing a user option to choose whether to persistently associate the user with the selection of the set of one or more identifiers of attribute information providers.

19. The computer program product of claim 18 wherein the method further comprises:

enrolling the selection of the set of one or more identifiers of attribute information providers at the service provider.

20. The computer program product of claim 18 wherein the method further comprises:

storing the set of one or more identifiers of attribute information providers in a persistent token at the client.

21. The computer program product of claim 18 wherein the method further comprises:

storing the set of one or more identifiers of attribute information providers in a client-side information repository.

22. The computer program product of claim 17 wherein the method further comprises:

receiving the set of one or more identifiers of attribute information providers as input from the user.

23. The computer program product of claim 17 wherein the method further comprises:

retrieving the set of one or more identifiers of attribute information providers from administratively configured information.

24. The computer program product of claim 17 wherein the method further comprises:

providing a user option to choose whether to establish a relationship with an attribute information provider in the set of one or more identifiers of attribute information providers.

* * * * *